United States Patent
Yamaguchi

(10) Patent No.: US 6,500,026 B2
(45) Date of Patent: Dec. 31, 2002

(54) HYBRID CONNECTOR AND PROCESS FOR ASSEMBLING THE SAME

(75) Inventor: Noboru Yamaguchi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/895,329

(22) Filed: Jul. 2, 2001

(65) Prior Publication Data

US 2002/0004336 A1 Jan. 10, 2002

(30) Foreign Application Priority Data

Jul. 3, 2000 (JP) ........................................ 2000-201220
Jun. 20, 2001 (JP) ........................................ 2001-185972

(51) Int. Cl.[7] ............................................ H01R 33/945
(52) U.S. Cl. ................ 439/577; 439/540.1; 439/541.5; 439/701; 385/77; 385/78
(58) Field of Search ........................... 439/540.1, 541.5, 439/701, 577; 385/77–89, 75, 101, 76, 93

(56) References Cited

U.S. PATENT DOCUMENTS 6,217,230 B1 * 4/2001 Matsushita et al. ........... 385/78
6,341,899 B1 * 1/2002 Shirakawa et al. ........... 385/88

FOREIGN PATENT DOCUMENTS

JP 9-61677 3/1997

* cited by examiner

Primary Examiner—P. Austin Bradley
Assistant Examiner—Alexander Gilman
(74) Attorney, Agent, or Firm—Armstrong, Westerman & Hattori, LLP

(57) ABSTRACT

A hybrid connector and a process for assembling the hybrid connector are provided, by which the assmbling operation can be simplified and optical element modules can be stably positioned so that the workability of the assembling operation is improved and the optical loss is reduced. The hybrid connector 1 is assembled by a process including first to third assembly steps. In the first assembly step, each sleeve 7 is provisionally inserted halfway through a receiving cylinder 19 of a housing 2. In the second assembly step, optical element modules 8 and 9 are pressed so that the sleeve 7 is further inserted into the receiving cylinder 19 to reach the completely inserted state. Each projection 35 of the optical element modules 8 and 9 engages with a hollow portion 23 of the receiving cylinder 19. In the third assembly step, a shielding case 10 holds the optical element modules 8 and 9 and engages with the receiving cylinder 19 so as to fix a position of the optical element modules 8 and 9.

16 Claims, 11 Drawing Sheets

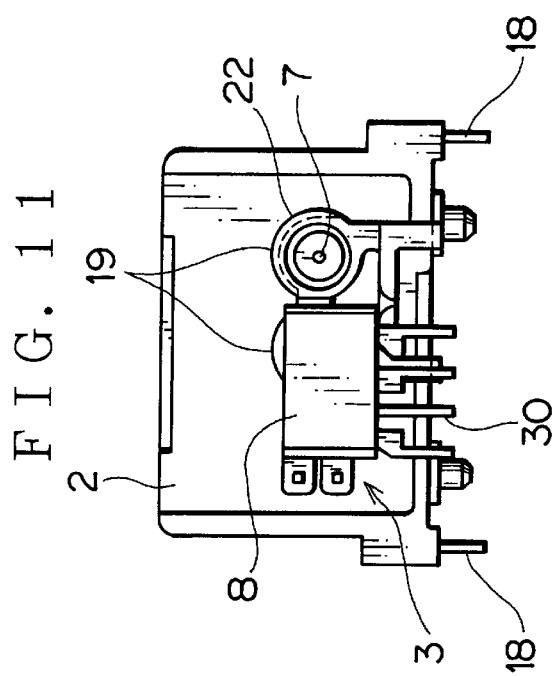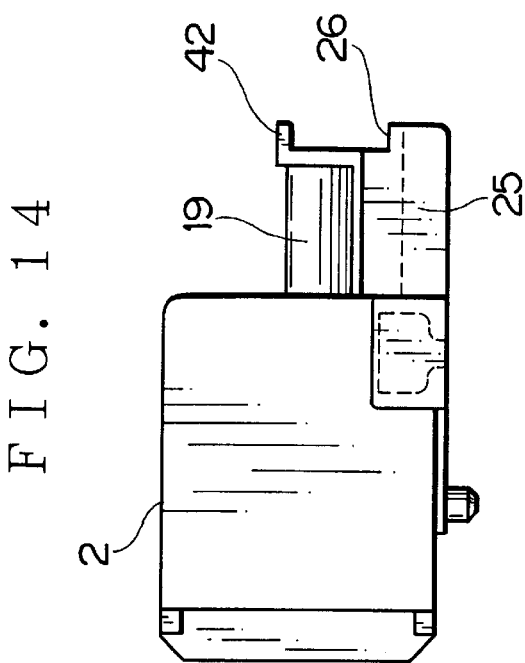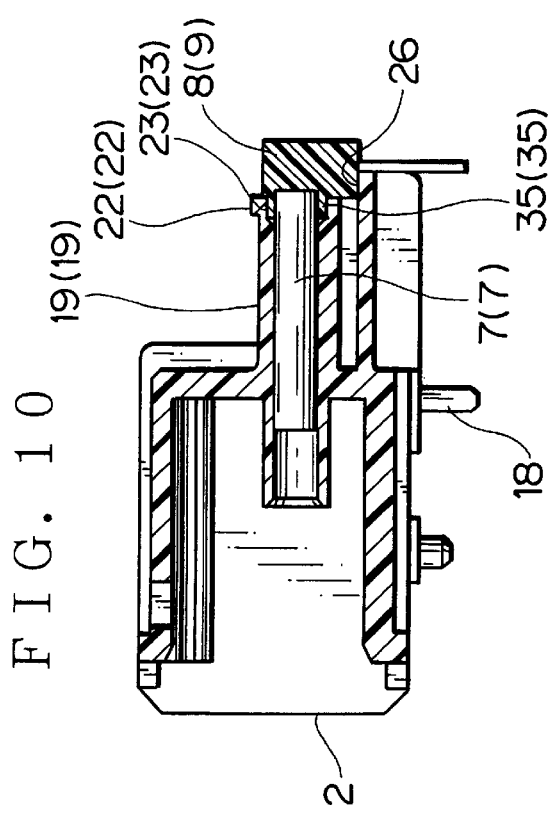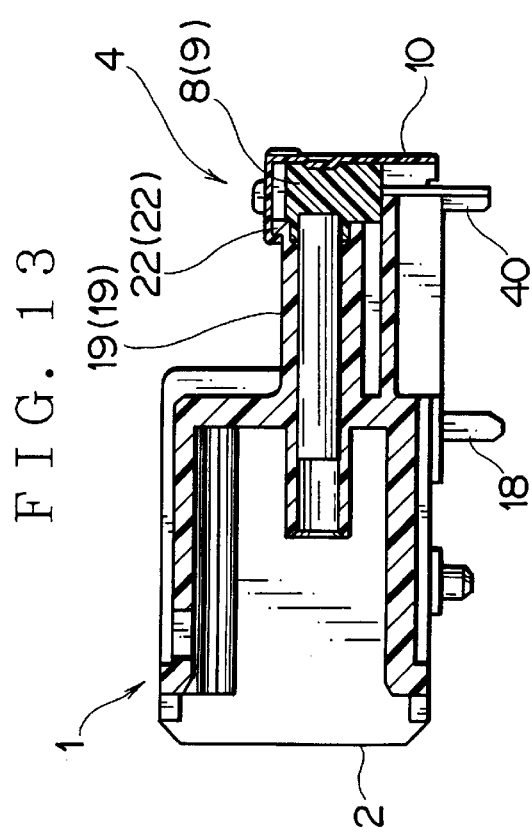

HYBRID CONNECTOR AND PROCESS FOR ASSEMBLING THE SAME

BACKGROUND OF THE INVENTION (1) Field of the Invention

The present invention relates to a hybrid connector, in which electric and optical connectors are integrally formed, so that a simple connecting operation completes the connection between the electric and optical connectors, and to a process for assembling the hybrid connector.

(2) Description of the Related Art

With regard to various vehicles including motorcars, extremely many signals from various sensors and those for controlling various electronic equipment have to be handled. When these signals are transmitted by using individual signal lines, the number of the signal lines becomes enormous, causing a wiring harness to be very heavy. In addition, in recent years, information transmitted from various electronic equipment has been enhanced and made much denser, causing a wiring harness to be furthermore heavy. Therefore, recently, a part of a wiring harness has been replaced by an optical fiber cable (optical fiber cord) and for example, a system in which an optical fiber cable connects nodes with each other has been employed.

When a part of a wiring harness is to be replaced by an optical fiber cable, for example for a motorcar manufacturer, an operation for connecting the electric and optical connectors becomes complicated and troublesome. Consequently, recently, a hybrid connector, in which electric and optical connectors are integrally formed so that a single connecting operation completes the connection between the electric and optical connectors, has been developed for its practical use.

However, since the hybrid connector is formed in such a way that the electric and optical connectors are integrally constituted therein, the hybrid connector is forced to have many components. Especially, the assembly of the optical connector is troublesome because it requires many manhours. Furthermore, there has been a problem that optical element modules constituting the optical connector can not be stably positioned upon the assembly.

If the optical element modules can not be stably positioned upon the assembly, it affects the workability of the assembling operation and sometimes affects the optical loss characteristic after the assembly.

SUMMARY OF THE INVENTION

It is therefore an objective of the present invention to solve the problem described above and to provide a process for assembling a hybrid connector, by which the assembling operation can be simplified and the optical element modules can be stably positioned so that the workability of the assembling operation is improved and the optical loss is reduced, as well as to provide such a hybrid connector.

In order to attain the above objective, a first aspect of the present invention is to provide a process for assembling a male hybrid connector having electric and optical connector members formed integrally with each other, the optical connector member including: at least one optical element module having an optical element; sleeves, each of which has an optical waveguide, provided in accordance with the number of the optical element modules; a housing shared with the electric connector member, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second assembly step of reaching a completely inserted state, in which each optical element module is pressed against an end face of the corresponding sleeve exposed from the receiving cylinder so as to further insert the sleeve into the corresponding receiving cylinder, and then engaging each second projection formed on the optical element module with a corresponding hollow portion formed in the receiving cylinder so as to align a position of the optical element with an axis of the corresponding receiving cylinder; and a third assembly step of engaging the case with the receiving cylinder, while the case holding the optical element modules, so as to fix a position of the optical element module.

According to the constitution described above, the hybrid connector is assembled through a process including the first to third assembly steps. That is, the optical connector portion of the hybrid connector is assembled in the first to third assembly steps.

In the first assembly step, the sleeve is provisionally partway inserted into the receiving cylinder of the housing. In the second assembly step, the optical element module is pressed so as to insert the sleeve further into the receiving cylinder, thereby the sleeve is completely (fully) inserted into the receiving cylinder. At this time, the projection of the optical element module engages with the hollow portion of the housing side, thereby the position of the optical element is aligned with the axis of the receiving cylinder.

In the second assembly step, the assembly of the sleeve and that of the optical element modules are carried out simultaneously, thereby the assembly operation is simplified.

In the second assembly step, each projection of the optical element modules engages with the hollow portion of the receiving cylinder, thereby no clearance arises and each position of the optical element modules is stable thereafter. Therefore, the workability improves and the optical loss is reduced.

In the second assembly step, the optical element module is pressed against the sleeve so that the sleeve is inserted into the receiving cylinder, thereby the optical loss due to the clearance between the sleeve and the optical element module is minimized.

In the third assembly step, the case holds the optical element modules. The case engages with the receiving cylinders, then each position of the optical element modules is fixed. Since these assemblies are carried out simultaneously, the assembly operation is simplified. Since the position of the optical element module is stable, the workability for assembling the case is improved.

A second aspect of the present invention is to provide a process for assembling a male hybrid connector having electric and optical connector members formed integrally with each other, the optical connector members including: at least one optical element module having an optical element; sleeves, each of which has an optical waveguide, provided in accordance with the number of the optical element modules; a housing shared with the electric connector member, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second modified assembly step of reaching a completely inserted state, in which each optical element module is pressed against an end face of the corresponding sleeve exposed from the receiving cylinder so as to further insert the sleeve into the corresponding receiving cylinder, and then placing the optical element module on a first wall formed in the housing or holding the optical element module between a pair of walls formed in the housing so as to prevent the optical element module from rotating; and a third assembly step of engaging the case with the receiving cylinder, while the case holding the optical element modules, so as to fix a position of the optical element module.

According to the constitution described above, the hybrid connector is simply assembled. The position of the optical element module is stabilized so as to improve the workability and to reduce the optical loss.

A third aspect of the present invention is to provide a process for assembling a male hybrid connector having electric and optical connectors formed integrally with each other, the optical connector member including: at least one optical element module having an optical element; sleeves, each of which has an optical waveguide, provided in accordance with the number of the optical element modules; a housing shared with the electric connector member, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second further modified assembly step of reaching a completely inserted state, in which each optical element module is pressed against an end face of the corresponding sleeve exposed from the receiving cylinder so as to further insert the sleeve into the corresponding receiving cylinder, then engaging each second projection formed on the optical element module with a corresponding hollow portion formed in the receiving cylinder so as to align a position of the optical element with an axis of the corresponding receiving cylinder, and then placing the optical element module on a first wall formed in the housing or holding the optical element module between a pair of walls formed in the housing so as to prevent the optical element module from rotating; and a third assembly step of engaging the case with the receiving cylinder, while the case holding the optical element modules, so as to fix a position of the optical element module.

According to the constitution described above, the hybrid connector is simply assembled. The position of the optical element module is stabilized so as to improve the workability and to reduce the optical loss.

Preferably, in the first assembly step, the sleeve is inserted into the receiving cylinder until the sleeve comes into contact with first projections formed in the receiving cylinder for press-inserting the sleeve, and in the second, second modified or second further modified assembly step, the sleeve is press-inserted into the receiving cylinder crushing the first projections.

According to the constitution described above, the sleeve is smoothly inserted in the first assembly step, thereby the assembly operation can be simplified further.

Preferably, a moving length of the sleeve in the receiving cylinder in the second, second modified or second further modified assembly step is shorter than that in the first assembly step.

According to the constitution described above, in the second (second modified or second further modified) assembly step, the labor required for press-insertion of the sleeve is reduced, thereby the assembly operation can be simplified further.

A fourth aspect of the present invention is to provide a process for assembling a male hybrid connector having electric and optical connector members formed integrally with each other, the optical connector member including: at least one optical element module having an optical element; sleeves, each of which has an optical waveguide, provided in accordance with the number of the optical element modules; a housing shared with the electric connector member, the housing having receiving cylinders for holding the sleeves therein; a sleeve holder to be inserted in the housing for holding the sleeves together with the receiving cylinders; and a case for holding the optical element modules, the process comprising the steps of:

a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;

a second assembly step with a sleeve holder of pressing each optical element module against an end face of the corresponding sleeve exposed from the receiving cylinder and/or an end of the sleeve holder so that each sleeve is completely inserted into the corresponding receiving cylinder and then engaging each second projection formed on the optical element module with corresponding hollow portions formed in the receiving cylinder and/or on the sleeve holder so as to align a position of the optical element with an axis of the corresponding receiving cylinder; and a third assembly step with a sleeve holder of engaging the case with the receiving cylinder, while the case holding the optical element modules, so as to fix a position of the optical element module.

According to the constitution described above, the hybrid connector is simply assembled. The position of the optical element module is stabilized so as to improve the workability and to reduce the optical loss.

The optical loss due to the clearance between the sleeve and the optical element module is minimized. The end face of the sleeve is free from the fat of the human hand, thereby the deterioration in the transmitting efficiency due to the assembly is prevented from occurring.

A fifth aspect of the present invention is to provide a process for assembling a male hybrid connector having electric and optical connector members formed integrally with each other, the optical connector member including: at least one optical element module having an optical element; sleeves, each of which has an optical waveguide, provided in accordance with the number of the optical element modules; a housing shared with the electric connector member, the housing having receiving cylinders for holding the sleeves therein; a sleeve holder to be inserted in the housing for holding the sleeves together with the receiving cylinders; and a case for holding the optical element modules, the process comprising the steps of:

a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;

a second modified assembly step with a sleeve holder of pressing each optical element module against an end face of the corresponding sleeve exposed from the receiving cylinder and/or an end of the sleeve holder so that each sleeve is completely inserted into the corresponding receiving cylinder and then placing the optical element module on a wall formed in the housing and/or the sleeve holder or holding the optical element module between a pair of walls formed in the housing and/or the sleeve holder so as to prevent the optical element module from rotating; and a third assembly step with a sleeve holder of engaging the case with the receiving cylinder, while the case holding the optical element modules, so as to fix a position of the optical element module.

A sixth aspect of the present invention is to provide a process for assembling a male hybrid connector having electric and optical connector members formed integrally with each other, the optical connector member including: at least one optical element module having an optical element; sleeves, each of which has an optical waveguide, provided in accordance with the number of the optical element modules; a housing shared with the electric connector member, the housing having receiving cylinders for holding the sleeves therein; a sleeve holder to be inserted in the housing for holding the sleeves together with the receiving cylinders; and a case for holding the optical element modules, the process comprising the steps of:

a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;

a second further modified assembly step with a sleeve holder of pressing each optical element module against an end face of the corresponding sleeve exposed from the receiving cylinder and/or an end of the sleeve holder so that each sleeve is completely inserted into the corresponding receiving cylinder, then engaging each second projection formed on the optical element module with a corresponding hollow portion formed in the housing and/or the sleeve holder so as to align a position of the optical element with an axis of the corresponding receiving cylinder, and then placing the optical element module on a wall formed in the housing and/or the sleeve holder or holding the optical element module between a pair of walls formed in the housing and/or the sleeve holder so as to prevent the optical element module from rotating; and a third assembly step with a sleeve holder of engaging the case with the receiving cylinder, while the case holding the optical element modules, so as to fix a position of the optical element module.

In order to attain the objective, a seventh aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector, the housing having receiving cylinders for holding the sleeves therein; and a case for holding the optical element modules and positioning the optical element modules with respect to the housing, wherein a hollow portion depressed along an axis of the receiving cylinder is formed in the receiving cylinder at the side into which the sleeve is inserted and each optical element module is provided with a second projection for engaging with the hollow portion and aligning the position of the optical element with the axis.

According to the constitution described above, the projection of the optical element module is formed so as to engage with the hollow portion of the housing side, thereby the position of the optical element can be aligned with the axis of the receiving cylinder. The engagement stablizes the position of the optical element module, thereby the workability improves and the optical loss is reduced.

An eighth aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector member, the housing having receiving cylinders for holding the sleeves therein; and a case for holding the optical element modules and positioning the optical element modules with respect to the housing, wherein a first wall is formed in the housing at the side into which the sleeve is inserted so that the first wall places the optical element modules thereon and prevents the optical element modules from rotating before the case covers the optical element modules.

According to the constitution described above, the positional shift of the optical element modules due to the rotation thereof is prevented from occurring and each position of the optical element modules is stabilized. Therefore, the workability improves and the optical loss is reduced.

A ninth aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector member, the housing having receiving cylinders for holding the sleeves therein; and a case for holding the optical element modules and positioning the optical element modules with respect to the housing, wherein a first wall is formed in the housing at the side into which the sleeve is inserted so that the first wall places the optical element modules thereon and prevents the optical element modules from rotating before the case covers the optical element modules, a hollow portion depressed along an axis of the receiving cylinder is formed in the receiving cylinder at the side into which the sleeve is inserted, and each optical element module is provided with a second projection for engaging with the hollow portion and aligning the position of the optical element with the axis.

According to the constitution described above, the position of the optical element module is stabilized, thereby the workability improves and the optical loss is reduced.

Preferably, a second wall, which faces the first wall and holds the optical element modules against the first wall, is formed on the receiving cylinder.

According to the constitution described above, the optical element module is securely prevented from rotating, thereby the workability further improves and the optical loss is further reduced.

A tenth aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector member, the housing having receiving cylinders for holding the sleeves therein;

a sleeve holder to be inserted in the housing for holding the sleeves together with the receiving cylinders; and a case for holding the optical element modules and positioning the optical element modules with respect to the housing, wherein a hollow portion depressed along an axis of the receiving cylinder is formed in the receiving cylinder at the side into which the sleeve is inserted and/or on an end of the sleeve holder, and each optical element module is provided with a second projection for engaging with the hollow portion and aligning the position of the optical element with the axis.

According to the constitution described above, the position of the optical element module is stabilized so as to improve the workability and to reduce the optical loss.

An eleventh aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector, the housing having receiving cylinders for holding the sleeves therein;

a sleeve holder to be inserted in the housing for holding the sleeves together with the receiving cylinders; and a case for holding the optical element modules and positioning the optical element modules with respect to the housing, wherein a first wall is formed in the housing at the side into which the sleeve is inserted and/or on an end of the sleeve holder so that the first wall places the optical element modules thereon and prevents the optical element modules from rotating before the case covers the optical element modules.

A twelfth aspect of the present invention is to provide a male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector, the housing having receiving cylinders for holding the sleeves therein;

a case for holding the optical element modules and positioning the optical element modules with respect to the housing, wherein a first wall is formed in the housing at the side into which the sleeve is inserted and/or on an end of the sleeve holder so that the first wall places the optical element modules thereon and prevents the optical element modules from rotating before the case covers the optical element modules, a hollow portion depressed along an axis of the receiving cylinder is formed in the receiving cylinder at the side into which the sleeve is inserted, and each optical element module is provided with a second projection for engaging with the hollow portion and aligning the position of the optical element with the axis.

Preferably, a second wall, which faces the first wall and holds the optical element modules against the first wall, is formed on the receiving cylinder and/or the sleeve holder.

BRIEF DESCRIPTION OF THE DRAWINGS

FIG. 10 is a sectional view illustrating a completely inserted state in a second assembly step after the optical element module is pressed;

FIG. 11 is a rear view of the state shown in FIG. 10;

FIG. 13 is a sectional view illustrating a state, in which the assembly is completed;

FIG. 14 is a right side view illustrating another example of the housing;

FIG. 15 is a perspective view illustating the primary part of the view shown in FIG. 14;

DESCRIPTION OF THE PREFERRED EMBODIMENTS

In the following, the preferred embodiments of the present invention will be explained with reference to the attached drawings.

Figure 1:
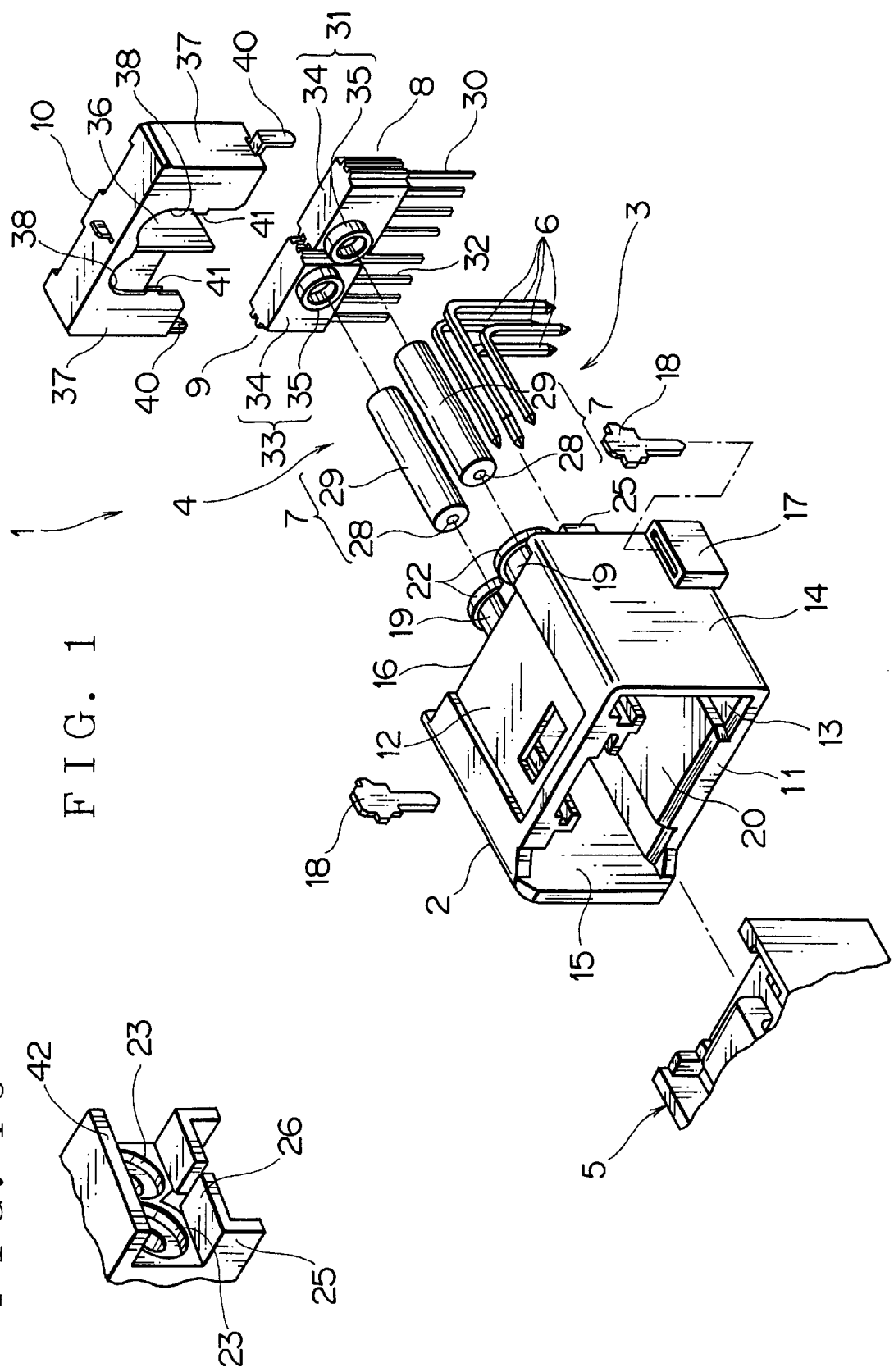
FIG. 1 is an exploded perspective view of a hybrid connector according to a preferred embodiment of the present invention.
Figure 2:
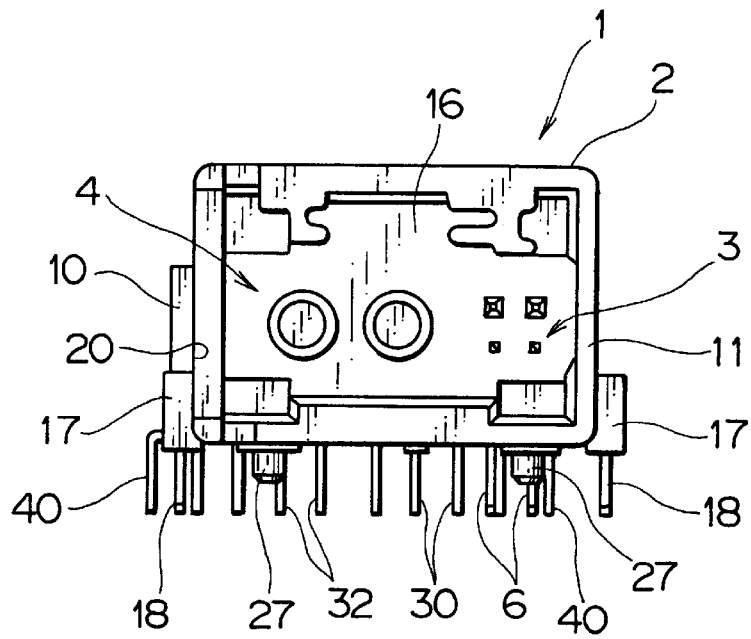
FIG. 2 is a front view of the hybrid connector.
Figure 3:
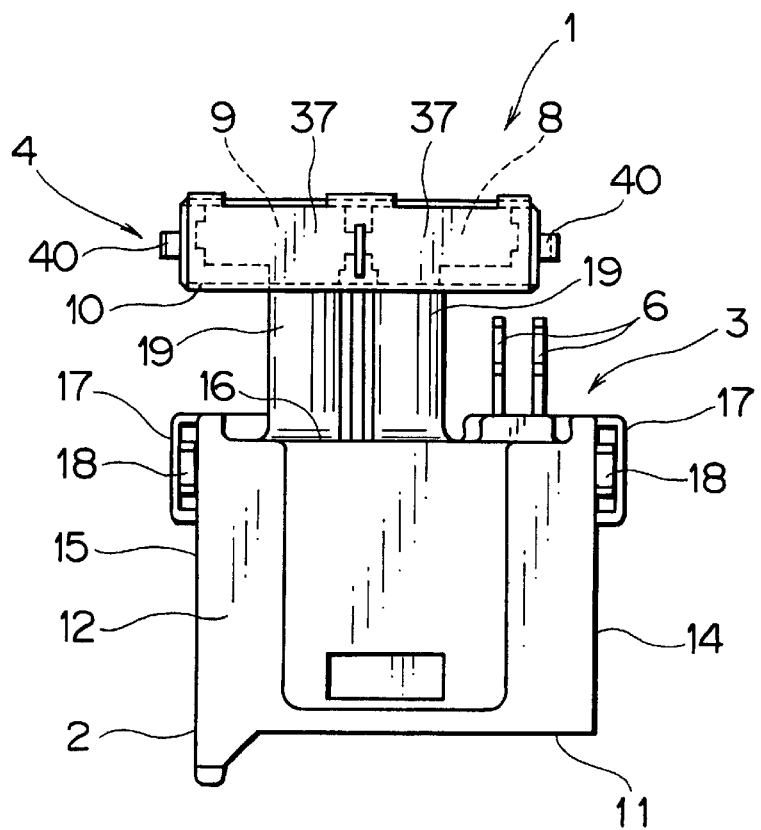
FIG. 3 is a plan view of the hybrid connector.
Figure 4:
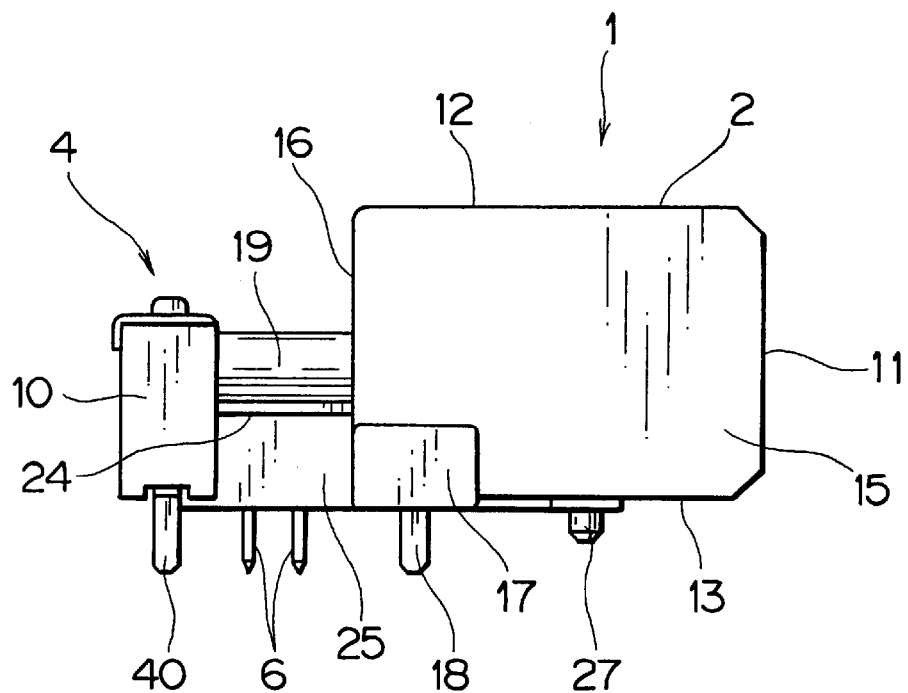
FIG. 4 is a left side view of the hybrid connector.
Figure 5:
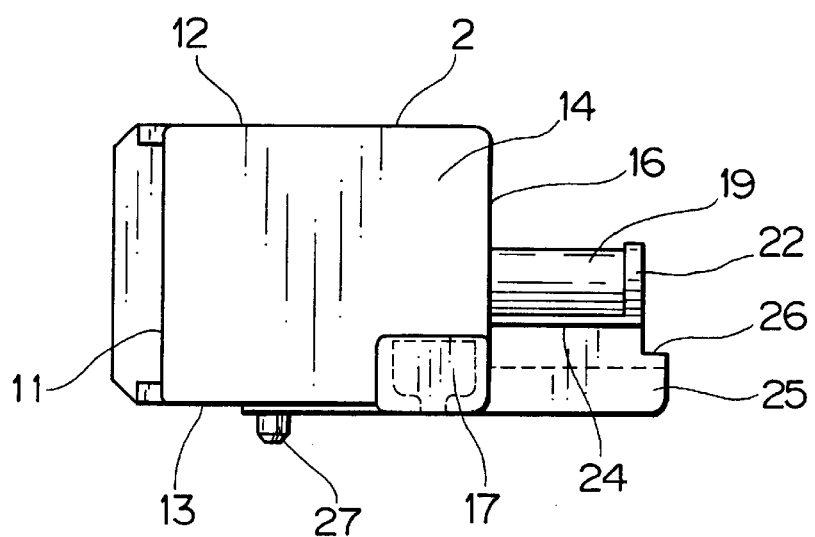
FIG. 5 is a right side view of the housing.

FIG. 1 is an exploded perspective view of a hybrid connector according to a preferred embodiment of the present invention. FIG. 2 is a front view of the hybrid connector; FIG. 3 is a plan view of the hybrid connector; FIG. 4 is a left side view of the hybrid connector; and FIG. 5 is a right side view of the housing.

In the present specification, the hybrid connector is defined as a connector, in which electric and optical connectors are integrally formed.

In FIG. 1, the reference numeral 1 denotes a male hybrid connector to be mounted on a print-circuit board, which is not shown in the figure. The hybrid connector 1 comprises an electric connector 3 and an optical connector 4, both of which share a housing 2. As explained later, the hybrid connector according to the present invention is constructed so that the assembling operation thereof can be easily carried out and the optical element modules 8 and 9 can be stably positioned upon the assembly.

The hybrid connector 1 is connected to a female hybrid connector 5, in which two optical fiber cables (optical fiber cords; not shown in the figure), on each end of which a corresponding ferrule is mounted, are mounted in parallel in a housing of the female hybrid connector 5. Out of the two optical fiber cables, one is for transmitting while the other is for receiving. On an end face of the ferrule, there is exposed a core portion ((plastic) optical fiber consisting of a core and a clad), an optical axis of which aligns with that of a respective optical waveguide 28 in a sleeve 7 explained later on.

The electric connector 3 consists of the housing 2 and electric terminals (PCB terminals) 6. The optical connector 4 consists of the housing 2, the sleeves 7, optical element modules 8 and 9, and a shielding case 10. The optical element modules 8 and 9 of the optical connector 4 may be called a receiving/emission module, receiving/ transmitting module or a fiber optic transceiver (FOT). The shielding case 10 corresponds to the case described in the claims.

In the following, each element of the hybrid connector 1 will be explained with reference to FIGS. 1–5, thereafter the assembly (method of the assembly) of the hybrid connector 1 will be explained in detail.

The housing 2 made of an insulative synthetic resin is formed in a rectangular box shape, in which a front face 11 is opened. That is, the housing 2 is formed in a rectangular box shape with an upper wall 12, bottom wall 13, right sidewall 14, left sidewall 15 and an inside wall 16. The upper wall 12 is provided with a lock portion, with which a locking arm formed on the hybrid connector 5 is engaged. Each of the right sidewall 14 and the left sidewall 15 is provided with a corresponding pocket 17 for receiving a fixing pin 18 made of metal therein and engaging with the same. Each pocket 17 is provided with a through hole, which is opened at the print-circuit board side, and a part of the fixing pin 18 is fixed to the print-circuit board through the through hole.

The inside wall 16 of the housing 2 is provided integrally with a pair of receiving cylinders 19, each of which is formed in a cylindrical shape so that the inner cross section thereof is round. The receiving cylinder 19 has a length in accordance with the length of the sleeve 7. The receiving cylinder 19 protrudes toward an engaging space 20 for engaging with the hybrid connector 5 in the housing 2 and is formed to also protrude toward the rear of the inside wall 16. The ferrules are inserted from the engaging space 20 side.

Figure 6:
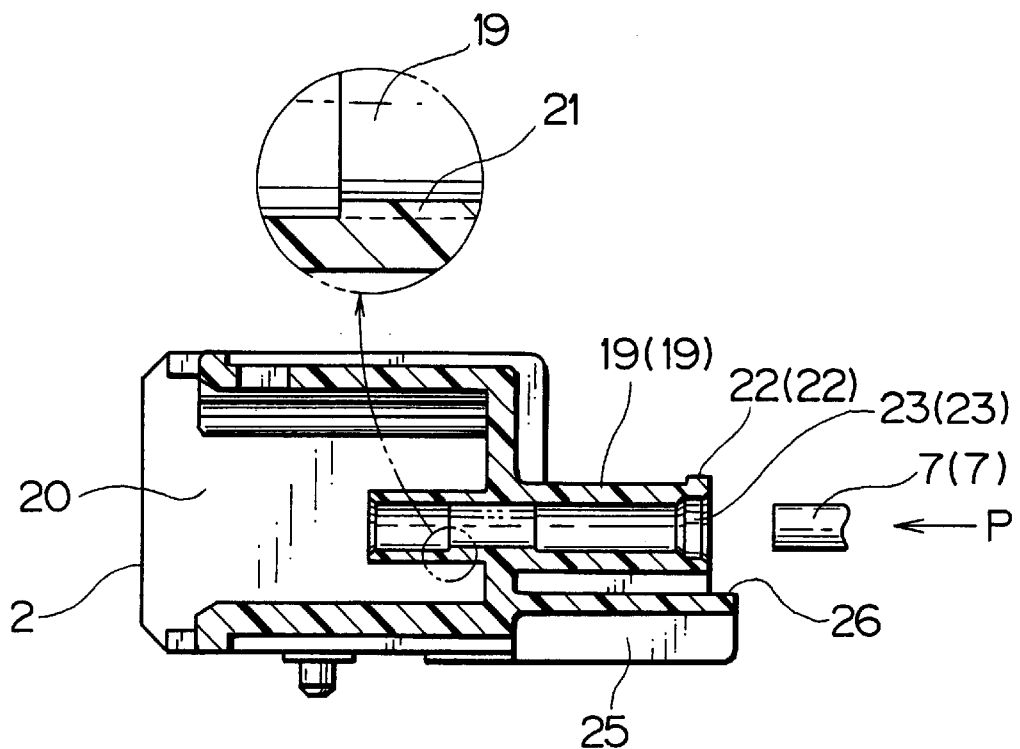
FIG. 6 is a sectional view illustrating a first assembly step before the insertion of the sleeve.

On an inner face of the receiving cylinder 19 at the middle thereof in the length direction, there are formed, for example, three first projections 21 (see FIG. 6). The three first projections 21 are formed along the length direction of the receiving cylinder 19 with 120° pitch. A diameter of a circular arc drawn by the end of the three first projections 21 is formed a little smaller than the diameter of the sleeve 7 and the sleeve 7 inserted into the receiving cylinder 19 is press fit thereinto crushing the three first projections 21. The inner diameter of the receiving cylinder 19 is set up so that each sleeve 7 can be smoothly inserted thereinto until the sleeve 7 comes into contact with the three first projections 21.

On the outside end of each receiving cylinder 19 at the side from which the sleeve 7 is inserted, a corresponding engaging part 22 protruding by having a ring-shape is integrally formed on the receiving cylinder 19. On an end face of the outside end, there is formed a hollow portion 23 (see FIG. 6 or FIG. 15) depressed along the axis of the receiving cylinder 19. On the outside end of each receiving cylinder 19 at the side of the right sidewall 14 and the left sidewall 15, there is provided a step 24. In addition, at the bottom wall 13 side thereof, a leg 25 is continuously formed.

The protruding direction of the engaging part 22 crosses at right angles with respect to the axis of the receiving cylinder 19 and the thickness of the engaging part 22 is formed to give an enough stiffness threreto so that it can resist against a force acting along the axis of the receiving cylinder 19. The shielding case 10 engages with the engaging parts 22.

The diameter of the hollow 23 is larger than the inner diameter of the receiving cylinder 19. The hollow 23 engages with a second projection 35 (explained later on) of the optical element module 8 and 9. Each step 24 is formed along the axis of the receiving cylinder 19 and engages with a corresponding stopper 41 (explained later on) of the shielding case 10.

The leg 25 is formed in a letter H-shape in a cross sectional view thereof and the portion, which protrudes rearward exceeding the end face of the end of the receiving cylinder 19, is provided with a wall 26, which crosses at right angles with respect to the end face. The wall 26 serves as a stopper to prevent the optical element modules 8 and 9 from rotating and is formed to have a flat surface in the present preferred embodiment.

Under the bottom wall 13 of the housing 2, there are integrally formed third projections 27 to be inserted into the print-circuit board.

Each electric terminal 6 is a known electrically conductive male terminal having a letter L-shape. Out of two parts of the L-shape, one part is situated in the engaging space 20 of the housing 2 through the inside wall 16, while the other part is to be fixed on the print-circuit board. Since the electric terminals 6 are mounted on two steps upper and lower (two terminals on each step) with respect to the housing 2, the electric terminals 6 having two different kinds of length are needed.

Each sleeve 7 consists of an optical waveguide 28 consisting of a core and a clad and a cylindrical holder 29. Preferably, the optical waveguide has an equivalent refractive index to that of the core portion of the optical fiber cable. The sleeve 7 can be formed by using the optical fiber cable. (That is, the sleeve 7 is cut to have a predetermined length and an end surface of the sleeve 7 is, for example, polished.)

The optical element module 8 consists of a plurality of lead frames 30, a molded part (not shown in the figure), and a case 31. A light-emitting element (not shown in the figure) is mounted on one lead frame 30 out of a plurality of the lead frames 30. The wire bonding method is applied. A plurality of the lead frames 30 are fixed on the print-circuit board by soldering. The light-emitting element is situated near to the optical element module 9, i.e. a little away from the center of the optical element module 8 (or the center of the molded part) so as to make the hybrid connector 1 compact. (The light-emitting element may be situated at said center.) The light-emitting element corresponds to an optical element described in claims and is, for example, a light-emitting diode (LED).

The molded part is made of light-transmitting transparent resin such as epoxy resin, i.e. preferably a resin having an equal refractive index to that of the core portion of the optical fiber cable. The molded part buries the top half of a plurality of the lead frames 30 and protects the light-emitting element and so on.

The optical element module 9 consists of a plurality of lead frames 32, a molded part (not shown in the figure), and a case 33. A light-receiving element (not shown in the figure) is mounted on one lead frame 32 out of a plurality of the lead frames 32. The wire bonding method is applied. A plurality of the lead frames 32 are fixed on the print-circuit board by soldering. The light-receiving element is situated near to the optical element module 8, i.e. a little away from the center of the optical element module 9 (or the center of the molded part) so as to make the hybrid connector 1 compact. (The light-receiving element may be situated at said center.) The light-receiving element corresponds to an optical element described in claims and is, for example, a photodiode (PD).

In the present preferred embodiment, since the light-emitting element and the light-receiving element are shifted so as to be adjacent to each other, the hybrid connector is formed compact. Moreover, since a part of the optical element module 8 is arranged so as to overlap with the electric terminals 6 leaving a distance with respect to the electric terminals 6, the hybrid connector is formed even more compact.

Each of the cases 31 and 33 is made of an electrically conductive synthetic resin (or electrically insulative synthetic resin) containing carbon fibers and the like, and consists of a case housing 34 and a cylindrical second projection 35 protruding from the case housing 34.

Each case housing 34 has a shape of box having the bottom, into which the molded part is inserted by a little pressing. An opening (for inserting the molded part) of the case housing 34 is formed flat, which is put on the wall 26 upon the assembly. A wall situated at the opposite side of said opening is also formed flat.

Each second projection 35 is formed in accordance with the position of the light-emitting element and the light-receiving element. Since the second projection 35 is cylindrical, the second projection 35 can face the light-emitting element and the light-receiving element. The second projection 35 engages with the hollow portion 23 upon the assembly.

The shielding case 10, formed by pressing an electrically conductive metal sheet, has a spring property useful upon the assembly and so on. The shielding case 10 has two receiving parts 37 partitioned by a wall 36, in each of which a U-shaped notched portion 38, a fourth projection 39 (see FIG. 12) that presses the optical element module 8 or 9 onto the notched portion 38 side, and a leg 40 for fixing the case 10 on the print-circuit board are formed.

The receiving part 37 receives the optical element module 8 or 9. When the optical element modules 8 and 9 are received into the receiving parts 37 together with the engaging parts 22 upon the assembly, the optical element modules 8 and 9 are press-held with the aid of said spring property.

When the shielding case 10 has a spring property so that each of the optical element modules 8 and 9 can be pressed onto the end face of the corresponding receiving cylinders 19, the case 10 can be made of an electrically conductive synthetic resin containing carbon fibers and the like. The electrically conductive case 10 improves the shielding property thereof for the optical element modules 8 and 9.

Each notched portion 38 is formed in accordance with the outer diameter of the receiving cylinder 19, at the periphery of which a projecting stopper 41 protruding inwardly is formed. When the case 10 is combined with the receiving cylinders 19, the projecting stopper 41 engages with the step 24 of the receiving cylinders 19. That is, the projecting stopper 41 prevents the case 10 from coming off.

Each fourth projection 39 (see FIG. 12) is formed on the rear wall situated at the opposite side of the front wall, on which the corresponding notched portion 38 is formed. The fourth projection 39 is protrudingly formed, for example, in an ellipse shape by an embossing press. Each leg 40 for fixing the case 10 on the print-circuit board is continuously formed to the sidewall of the receiving parts 37 and is fixed on the print-circuit board. The leg 40 functions as a ground terminal.

In the following, an example of the assembly (method of the assembly) of the hybrid connector 1 will be explained in detail. The electric terminals 6 are received in the housing 2 in advance. In the following, the assembly (method of the assembly) of the optical connector 4 portion will be explained.

After the electric connector 3 portion is assembled, the optical connector 4 portion is to be assembled in sequence through a first assembly step, a second assembly step, and a third assembly step.

The second assembly step described above corresponds to a second further modified assembly step which is also part of the present invention. The second assembly step excludes the contents of the wall 26 from the following explanation. The second modified assembly step excludes the contents of the second projection 35 and the hollow portion 23 from the following explanation.

Figure 7:
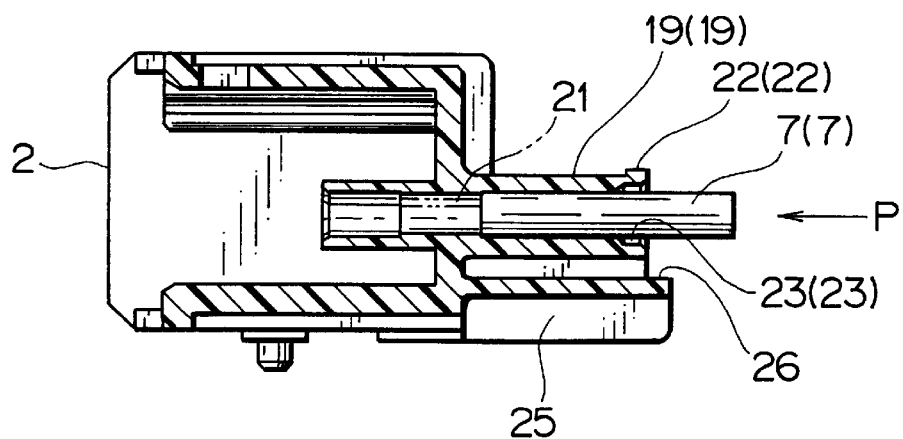
FIG. 7 is a sectional view illustrating a provisionally inserted state in the first assembly step being partway through the insertion of the sleeve.
Figure 8:
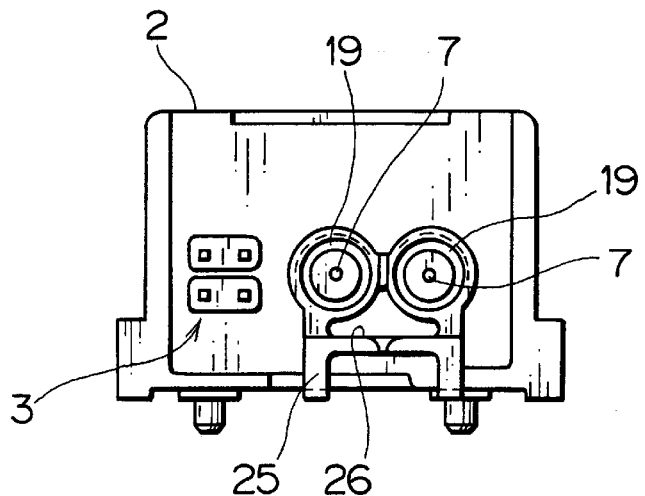
FIG. 8 is a rear view of the state shown in FIG. 7.

The first assembly step will be explained with reference to FIGS. 6–8. FIG. 6 is a sectional view illustrating the first assembly step before the insertion of the sleeve, FIG. 7 is a sectional view illustrating a provisionally inserted state in the first assembly step being partway through the insertion of the sleeve, and FIG. 8 is a rear view of the state shown in FIG. 7.

In FIG. 6, the sleeves 7 are moved in the direction of arrow P by being held at the sides thereof. The sleeves 7 move toward the end face of the receiving cylinders 19. Then, each of the sleeves 7 is inserted into the respective receiving cylinder 19 from the end face of the receiving cylinder 19 in the direction of arrow P and then, as shown in FIG. 7, each end of the respective sleeves 7 comes in contact with the first projections 21. At this time, each sleeve 7 is partway inserted into the receiving cylinder 19 (the provisionally inserted state). As shown in FIG. 8, when two sleeves 7 are provisionally inserted, the assembly advances to the second step.

Figure 9:
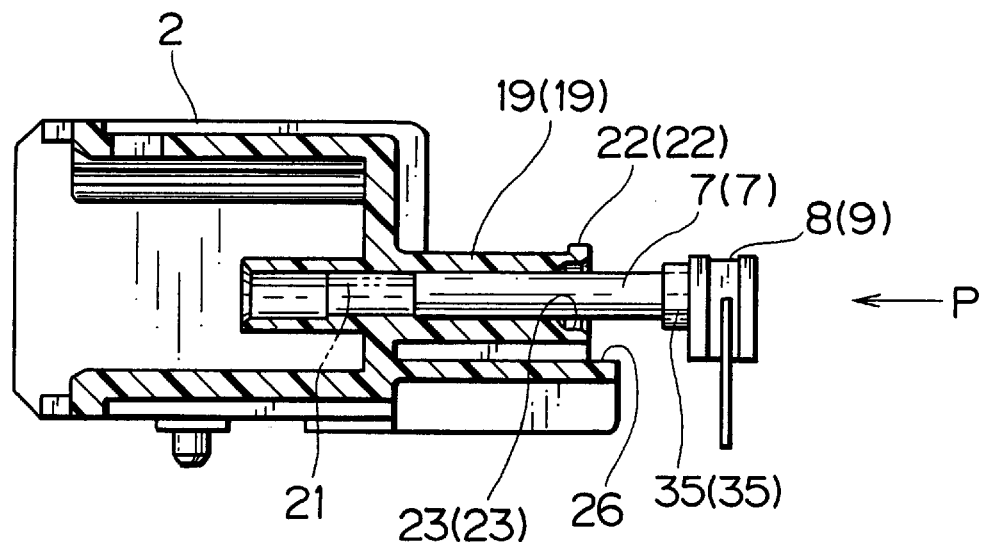
FIG. 9 is a sectional view illustrating a state, in which the optical element module is started to be pressed, in a second assembly step.

The second assembly step will be explained with reference to FIGS. 9–11. FIG. 9 is a sectional view illustrating a state in which the optical element module is started to be pressed, in the second assembly step; FIG. 10 is a sectional view illustrating a completely inserted state in the second assembly step after the optical element module is pressed and FIG. 11 is a rear view of the state shown in FIG. 10.

In FIG. 9, each of the optical element modules 8 and 9 is set on the corresponding end face of the sleeve 7, which is exposed from the receiving cylinder 19. The end face of the sleeve 7 is received in the second projection 35 and in this state, when each of the optical element modules 8 and 9 is pressed in the direction of arrow P, the sleeve 7 is further inserted crushing the three first projections 21, then a state (completely inserted state) shown in FIG. 10 is realized. The second projection 35 of each of the optical element modules 8 and 9 is inserted in and engaged with the hollow portion 23 of the receiving cylinder 19, thereby the light-emitting element and the light-receiving element are positioned so as to be aligned with the axis of the corresponding receiving cylinder 19 (the axis of the corresponding sleeve 7). The wall 26 prevents each of the optical element modules 8 and 9 from rotating (see FIGS. 10 and 11). For example, at this time, the fixing pins 18 are fixed to the print-circuit board.

At this time, the insertion amount of the sleeves 7 is determined by the optical element modules 8 and 9. There is no clearance between each sleeve 7 and the corresponding optical element module 8 or 9, thereby the optical loss due to the clearance is minimized. Furthermore, since the second projection 35 of each of the optical element modules 8 and 9 is inserted in and engaged with the hollow portion 23 of the receiving cylinder 19, each position of the light-emitting and light-receiving elements is aligned with the axis of the corresponding receiving cylinder 19, thereby the optical loss due to the discrepancy in the alignment between axes is reduced. (A position where the axes are aligned with each other is not limited to the position described above.)

In the second assembly step, since each of the optical element modules 8 and 9 presses the corresponding end face of each sleeve 7, the end face is free from the fat of the human hand, thereby the deterioration in the transmitting efficiency due to the assembly is prevented from occurring.

As shown in FIGS. 14 and 15, if a second wall 42 is provided at the opposite side of the wall 26, the walls 42 and 26 hold the optical element modules 8 and 9 therebetween, thereby each of the optical element modules 8 and 9 is more securely prevented from rotating. With the constitution described above, the assembly of the shielding case 10 is easily carried out in the following third assembly step.

Figure 12:
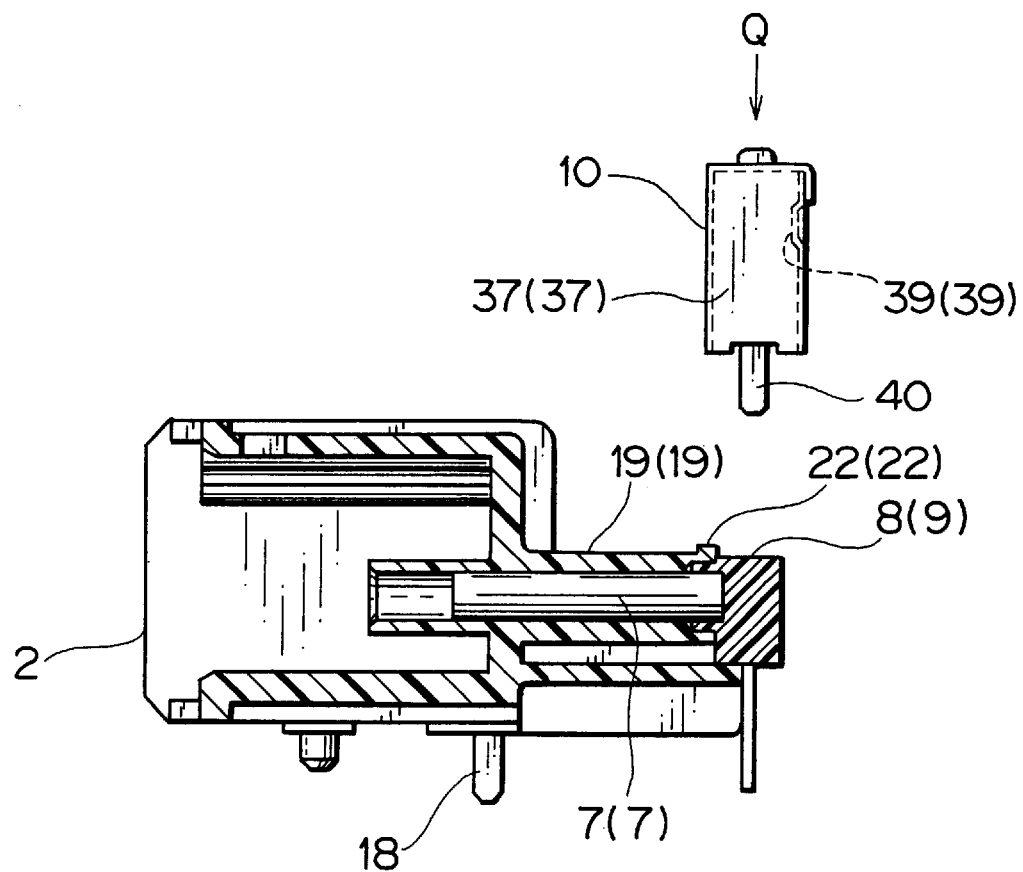
FIG. 12 is a sectional view illustrating a third assembly step before the mounting of the shielding case.

After the completely inserted state is realized as described above, the assembly advances to the third step. The third assembly step will be explained with reference to FIGS. 12 and 13. FIG. 12 is a sectional view illustrating the third assembly step before the mounting of the shielding case and FIG. 13 is a sectional view illustrating a state, in which the assembly is completed.

As shown in FIG. 12, the shielding case 10 is mounted from the direction of arrow Q. As shown in FIG. 13, the shielding case 10 engages with the engaging parts 22 to hold the optical element modules 8 and 9 therein. The shielding case 10 presses the optical element modules 8 and 9 against the end face of the respective receiving cylinders 19. Thus, each position of the optical element modules 8 and 9 is determined and fixed.

Since the optical element modules 8 and 9 are prevented from rotating, the shielding case 10 is easily assembled.

As explained above, the hybrid connector 1 is assembled through a process including the first, second (corresponding to a second further modified assembly step of the invention: hereinafter the same) and third assembly steps. That is, the optical connector 4 portion of the hybrid connector 1 is assembled through the first to third assembly steps described above.

Summarizing the first to third assembly steps, in the first assembly step, each sleeve 7 is provisionally inserted partway through a receiving cylinder 19 of a housing 2. In the second assembly step, optical element modules 8 and 9 are pressed so that the sleeve 7 is further inserted into the receiving cylinder 19 to reach the completely inserted state. Each projection 35 of the optical element modules 8 and 9 engages with a hollow portion 23 of the receiving cylinder 19. The position of the optical element is aligned with the axis of the receiving cylinder 19. The optical element modules 8 and 9 are placed on the first wall 26 of the housing 2 or held between a pair of the walls of the housing 2 (i.e. the first wall 26 and the second wall 42).

In the second assembly step, the assembly of the sleeves 7 and that of the optical element modules 8 and 9 are simultaneously carried out, thereby the assembly operation is simplified.

In the second assembly step, each projection 35 of the optical element modules 8 and 9 engages with a hollow portion 23 of the receiving cylinder 19, thereby no clearance arises and each position of the optical element modules 8 and 9 is stable thereafter. The optical element modules 8 and 9 are placed on the first wall 26 of the housing 2 or held between a pair of the walls of the housing 2 (i.e. the first wall 26 and the second wall 42), thereby the positional shift of the optical element modules 8 and 9 due to the rotation thereof is prevented from occurring and each position of the optical element modules 8 and 9 is stable thereafter. Therefore, the workability improves and the optical loss is reduced.

In the third assembly step, the shielding case 10 holds the optical element modules 8 and 9. The case 10 engages with the receiving cylinders 19, then each position of the optical element modules 8 and 9 is fixed. Since these assemblies are carried out simultaneously, the assembly operation is simplified. If a moving length of the sleeve 7 in the receiving cylinder 19 in the second assembly step is set shorter than that in the first assembly step, the labor required for press-insertion of the sleeve 7 is reduced.

Since the hybrid connector 1 is constructed as described above, the position of the optical element can be aligned with the axis of the corresponding receiving cylinder 19 and the positional shift of the optical element modules 8 and 9 due to the rotation thereof is prevented from occurring, thereby each position of the optical element modules 8 and 9 is stable thereafter. Therefore, the workability improves and the optical loss is reduced.

In the following, another preferred embodiment of the present invention will be explained.

Figure 16:
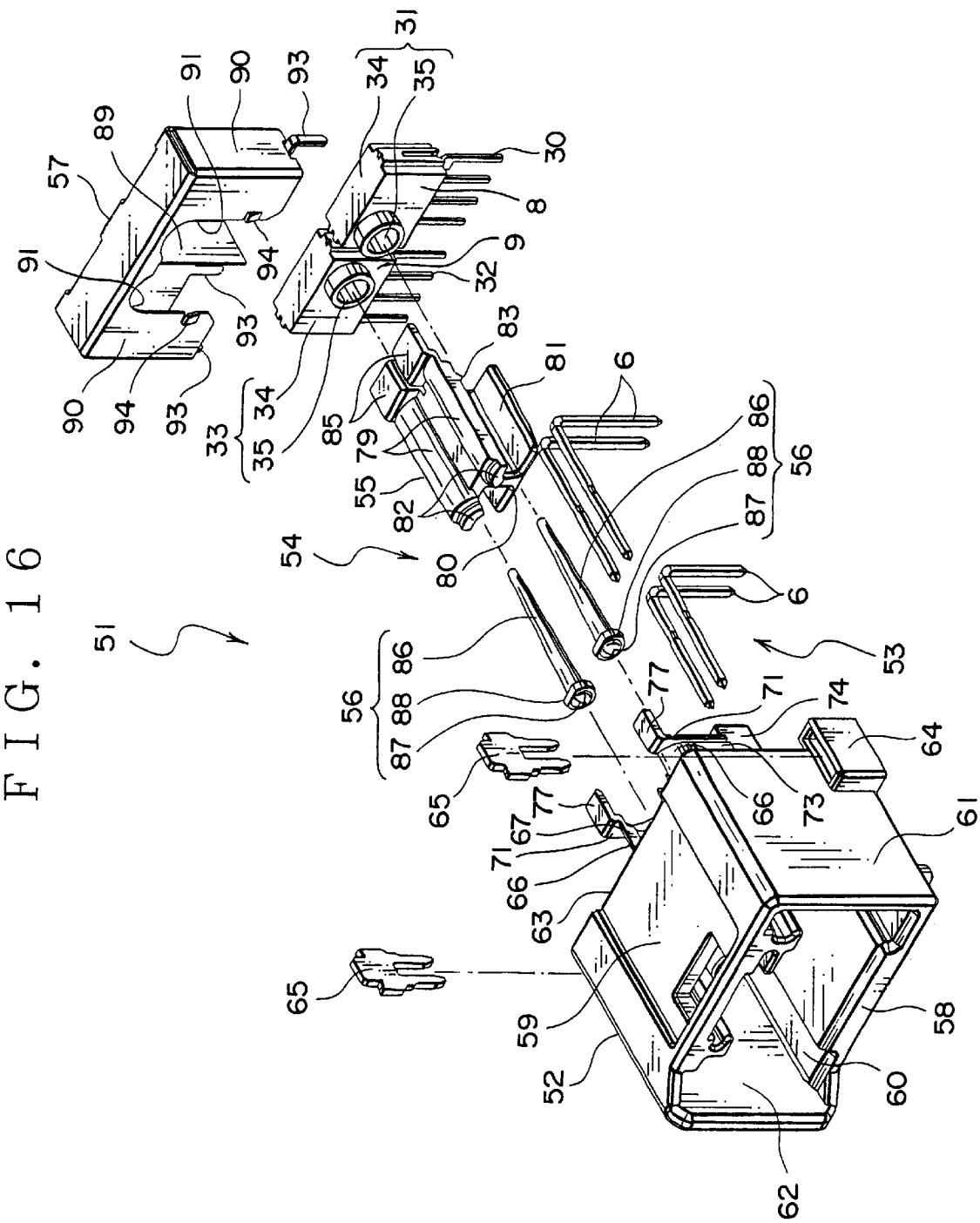
FIG. 16 is an exploded perspective view of a hybrid connector according to another preferred embodiment of the present invention.
Figure 17:
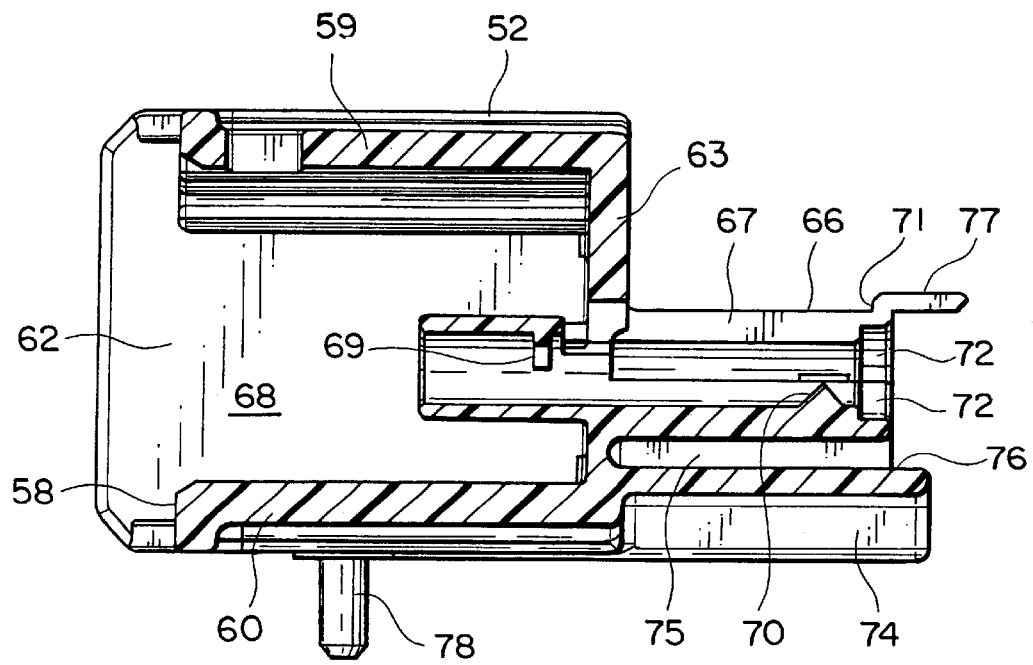
FIG. 17 is a sectional view (longitudinal sectional view taking the center of the receiving cylinder at the electric connector side as the standard) of a housing shown in FIG. 16.

FIG. 16 is an exploded perspective view of a hybrid connector according to the another preferred embodiment of the present invention and FIG. 17 is a sectional view of a housing.

In FIG. 16, there is shown a male hybrid connector 51 to be mounted on a print-circuit board (not shown in the figure). The hybrid connector 51 includes electrical connectors 53 and optical connectors 54, which share a housing 52 with each other. The hybrid connector 51 is constructed so that the assembling operation thereof can be easily carried out as well as the hybrid connector 1 described above (see FIG. 1) and the optical element modules 8 and 9 described above can be stably positioned upon the assembly.

The hybrid connector 51 is connected to a female hybrid connector similarly to the female hybrid connector 5 in FIG. 1. To end face of each ferrule of the hybrid connector 51, a corresponding lens sleeve 56 explained later on is optically combined. That is, both optical axes are aligned with each other.

The electric connector 53 consists of the housing 52 and electric terminals (PCB terminals) 6 described above. The optical connector 54 consists of the housing 52, the sleeve holder 55, lens sleeves 56 (corresponding to the sleeves described in the claims), optical element modules 8 and 9, and a shielding case 57 (corresponding to the case described in the claims).

In the following, each element of the hybrid connector 51 will be explained with reference to FIGS. 16 and 17, thereafter the assembly (method of the assembly) of the hybrid connector 51 will be explained in detail.

The housing 52 made of an insulative synthetic resin is formed in a rectangular box shape, in which a flont face 58 is opened. That is, the housing 52 is formed in a rectangular box shape with an upper wall 59, bottom wall 60, right sidewall 61, left sidewall 62 and an inside wall 63. The upper wall 59 is provided with a lock portion, with which a locking arm formed on the hybrid connector 51 (see FIG. 16) engaged. Each of the right sidewall 61 and the left sidewall 62 is provided with a corresponding pocket 64 for receiving a fixing pin 65 made of metal therein and engaging with the same. Each pocket 64 is provided with a through hole, which is opened at the print-circuit board side, and a part of the fixing pin 65 is fixed to the print-circuit board through the through hole.

The inside wall 63 of the housing 52 is provided integrally with a pair of receiving cylinders 66, each of which has a notched portion 67. The receiving cylinder 66 is formed in a cylindrical shape so that the inner cross section thereof is round when the sleeve holder 55 is inserted into the housing 52 (i.e., into the receiving cylinder 66 in this preferred embodiment) so as to close the notched portion 67. The receiving cylinder 66 has a length in accordance with the length of the lens sleeve 56. The receiving cylinder 66 protrudes toward an engaging space 68 in the housing 52 for engaging with the hybrid connector 51 (see FIG. 17) and is formed to also protrude toward the rear of the inside wall 63. Between the receiving cylinders 66, there is formed a slit (not shown in the figure) for guiding a perpendicular wall 80 (explained later on) of the sleeve holder 55 by notching. In the receiving cylinder 66, each ferrule described above is inserted from the engaging space 68 side.

On an inner face of each receiving cylinder 66, there are formed a stopper 69 (one of which being shown in the figure) against the corresponding lens sleeve 56 and a fifth projection 70 for aligning the optical axes. The stopper 69 is formed at the engaging space 68 side so that a flange 88 (explained later on) of the lens sleeve 56 abuts against the stopper 69. The fifth projection 70 is formed at the rear side of the inside wall 63 so as to hold an optical waveguide 86 (explained later on) of the lens sleeve 56. That is, the fifth projection 70 is formed in a triangular shape in the cross section thereof so as to put the optical waveguide 86 thereon, thereby holding the optical waveguide 86. (The top of the fifth projection 70 can be crushed to align the optical axes.) On the outside end of each receiving cylinder 66 at the side from which the lens sleeve 56 is inserted, a corresponding engaging part 71 is integrally formed with the receiving cylinder 66. On an end face of the outside end, there is formed a hollow portion 72 depressed along the axis of the receiving cylinder 66. On the outside end of each receiving cylinder 66 at the side of the right sidewall 61 and the left sidewall 62, there is provided a step 73 (only one of which being shown in the figure). In addition, at the bottom wall 60 side thereof, a leg 74 is continuously formed.

A shielding case 57 engages with the engaging part 71 and the thickness of the engaging part 71 is formed to give an enough stiffness threreto so that it can resist against a force acting along the axis of the receiving cylinder 66. The engaging part 71 may be formed with reference to the engaging part 22 (see FIG. 1) described above.

The diameter of a hollow 72 is larger than the inner diameter of the receiving cylinder 66. The hollow 72 engages with a second projection 35 of the optical element module 8 and 9. Each step 73 engages with a corresponding stopper 94 (explained later on) of the shielding case 57.

A leg 74 including a guide portion 75 is formed in a letter H-shape in a cross sectional view thereof. A horizontal wall 81 (explained later on) of the sleeve holder 55 can come into and out from the guide portion 75. The portion of the receiving cylinder 66, which protrudes rearward exceeding the end face of the end of the receiving cylinder 66, is provided with a first wall 76, which is similar in terms of the function to the first wall 26 (see FIG. 15) described above. The first wall 76 serves as a stopper to prevent the optical element modules 8 or 9 from rotating and is formed to have a flat surface. In this preferred embodiment, each second wall 77 facing the first wall 76 is provided with the engaging part 71. (The first wall 76 and second wall 77 hold the optical element modules 8 or 9 therebetween so as to prevent the optical element modules 8 or 9 from rotating.)

Under the bottom wall 60 of the housing 52, there are integrally formed projections 78 (only one of the projections 78 being shown) to be inserted into the print-circuit board.

The sleeve holder 55 is made of synthetic resin and formed so as to hold a pair of the lens sleeves 56 together with a pair of the receiving cylinders 66 when the sleeve holder is inserted into the housing 52. That is, the sleeve holder 55 consists of a pair of holder portions 79 for holding the lens sleeves 56 by closing the notched portion 67 of the receiving cylinder 66, the perpendicular wall 80 formed between a pair of the holder portions 79, and a horizontal wall 81 continuously formed with an end of the perpendicular wall 80.

Each holder portion 79 is provided with a corresponding press part 82, which abuts against a corresponding flange 88 (explained later on) of the lens sleeve 56 at the front end of the holder portion 79. Each holder portion 79 is also provided with a corresponding sixth projection 83 (Only one of the projections 83 is shown and the projections 83 has the same function as the fifth projection 70.) for aligning the optical axes, which is matched with the projection 70 of the receiving cylinder 66 on an inner surface of the holder portion 79. Furthermore, each holder portion 79 is provided with a hollow portion 84 (see FIG. 20; only one of the hollow portions 84 being shown) continuing to the hollow portion 72 of the receiving cylinder 66 and a wall 85 (corresponding to the second wall described in the claims) having the function of the second wall 77 at the rear end of the holder portion 79.

The perpendicular wall 80 is formed as a portion, which is guided by the slit of the receiving cylinder. The horizontal wall 81 is formed as a portion, which is guided by the guide portion 75.

The lens sleeve 56 is made of transparent synthetic regin or glass. Each lens sleeve 56 consists of a cone-shaped optical waveguide 86 having a tapered side thereof, a convex lens 87 formed at the end face of the optical waveguide 86 at the large diameter side thereof, and the flange 88 protrudingly formed toward the outside of the convex lens 87. As for the lens sleeve 56, the convex lens 87 faces an end of the ferrule and the end face of the optical waveguide 86 at the small diameter side thereof faces the light-emitting element (not shown in the figure) or the light-receiving element (not shown in the figure) of the optical element module 8 or 9.

On the side of the optical waveguide 86, there is formed an air layer, at the boundary of which the light transmitting through the optical waveguide 86 is totally reflected. The face of the flange 88 at the convex lens 87 side abuts against the stopper 69 of the receiving cylinder 66. The press part 82 of the sleeve holder 55 abuts against the face of the flange 88 at the optical waveguide 86 side thereof. In other wards, the lens sleeve 56 is pressed by the press part 82 and positioned by abutting against the stopper 69.

The sleeve is not limited to the lens sleeve 56 having the convex lens 87. The sleeve only has to have the flange 88 and may be a sleeve having no convex lens 87 or a sleeve, in which a pair of the optical waveguides 86 is straightly formed.

The shielding case 57, formed by pressing an electrically conductive metal sheet, has a spring property useful upon the assembly and so on. The shielding case 57 has two receiving parts 90 partitioned by a wall 89.

The receiving part 90 receives the optical element module 8 or 9. When the optical element modules 8 and 9 are received into the receiving parts 90 together with the engaging parts 71 upon the assembly, the optical element modules 8 and 9 are press-held with the aid of said spring property. Each receiving part 90 consists of a U-shaped notched portion 91, a fourth projection 92 (see FIG. 23; Only one of them is shown.) that presses the optical element module 8 or 9 onto the notched portion 91 side, and a leg 93 (Only three of four legs are shown.) for fixing the case 57 on the print-circuit board.

When the shielding case 57 has a spring property so that each of the optical element modules 8 and 9 can be pressed onto the end face of the corresponding receiving cylinders 66, the case 57 can be made of an electrically conductive synthetic resin containing carbon fibers and the like. The electrically conductive case 57 improves the shielding property thereof for the optical element modules 8 and 9.

Each notched portion 91 is formed in accordance with the outer diameter of the receiving cylinder 66, at the periphery of which a projecting stopper 94 protruding inwardly is formed. When the case 57 is combined with the receiving cylinders 66, the projecting stopper 94 engages with the lower part of the step 73 of the receiving cylinders 66 after being bent. That is, the projecting stopper 94 prevents the case 57 from coming off.

Figure 23:
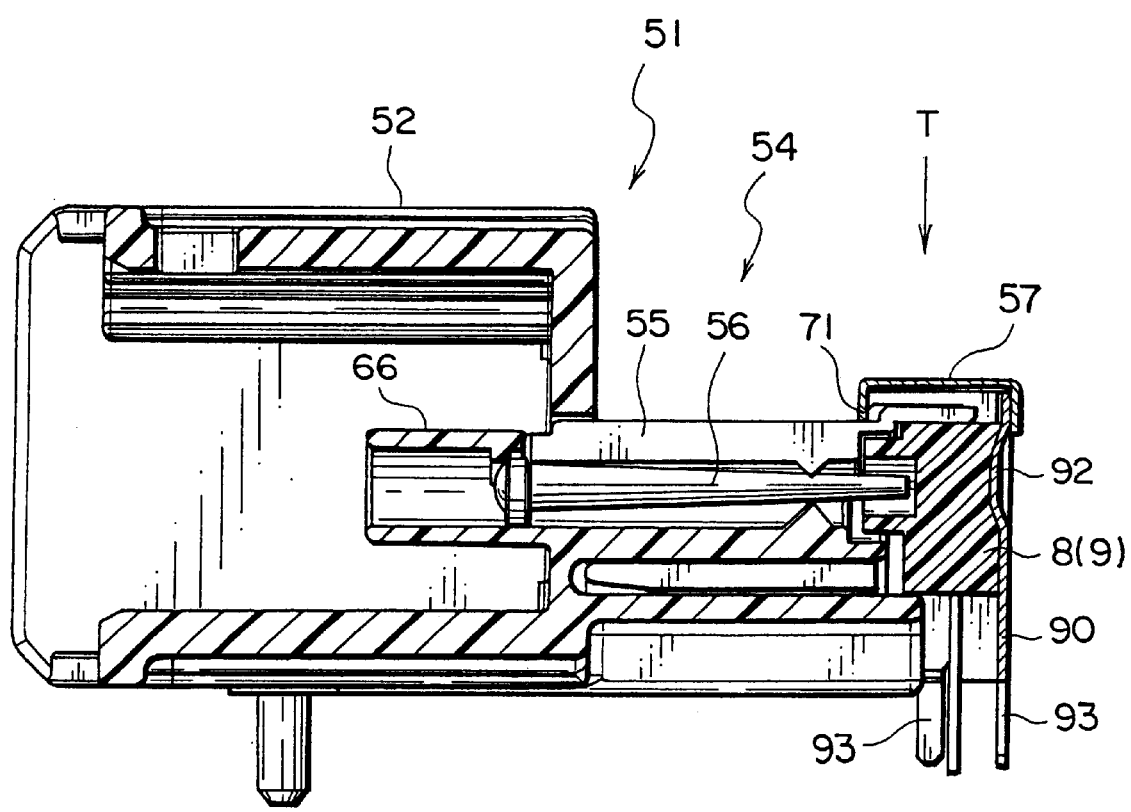
FIG. 23 is a sectional view illustrating a second assembly step with a sleeve holder after the shielding case (case) is mounted.

Each fourth projection 92 (see FIG. 23; Only one of the two being shown) is formed on the rear wall situated at the opposite side of the front wall, on which the corresponding notched portion 91 is formed. The fourth projection 92 is protrudingly formed, for example, in an ellipse shape by an embossing press. Each leg 93 for fixing the case 57 on the print-circuit board is continuously formed to the sidewall of the receiving parts 90 and is fixed on the print-circuit board. The leg 93 functions as a ground terminal.

In the following, an example of the assembly (method of the assembly) of the hybrid connector 51 will be explained in detail. The electric terminals 6 are received in the housing 52 in advance. In the following, the assembly (method of the assembly) of the optical connector 54 portion will be explained. As for a member consisting of a pair thereof, only one of a pair thereof is shown in the figure.

After the electric connector 53 portion is assembled, the optical connector 54 portion is to be assembled in sequence through a first assembly step with a sleeve holder, a second assembly step with a sleeve holder, and a third assembly step with a sleeve holder.

The second assembly step with a sleeve holder described above corresponds to a second further modified assembly step with a sleeve holder described in claims of the present specification. A second assembly step with a sleeve holder described in the claims excludes the contents of the first wall 76 (also the wall 85 and the second wall 77) from the following explanation. A second modified assembly step with a sleeve holder described in the claims excludes the contents of the second projection 35 and the hollow portions 72 and 84 from the following explanation.

Figure 18:
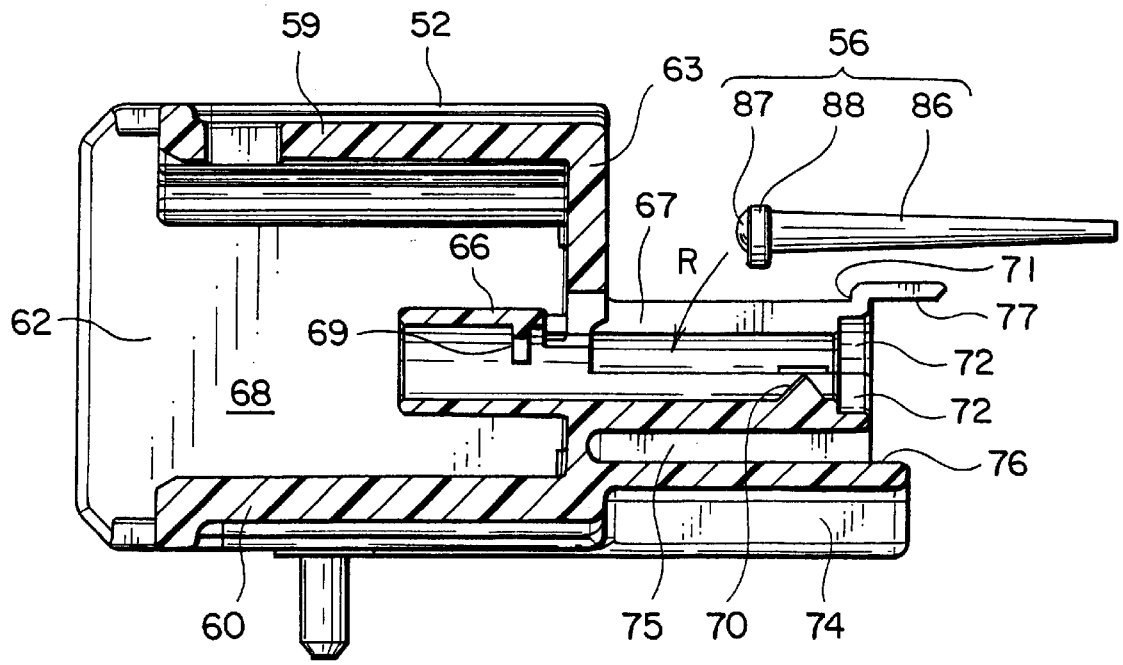
FIG. 18 is a sectional view illustrating a first assembly step with a sleeve holder before the insertion of the lens sleeve (sleeve)
Figure 19:
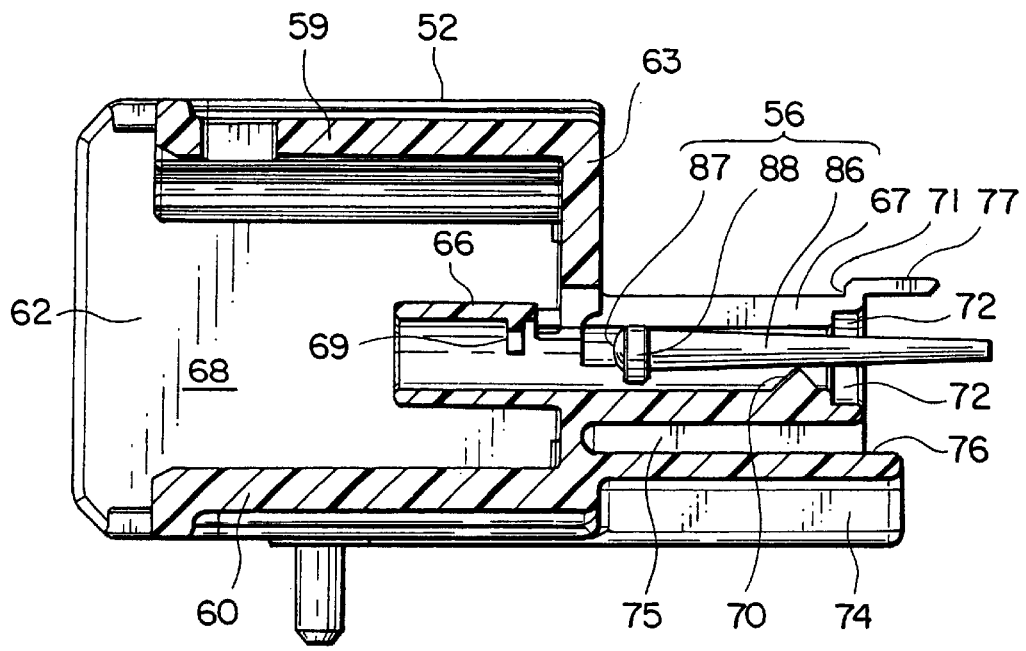
FIG. 19 is a sectional view illustrating a first assembly step with a sleeve holder when the lens sleeve is set in the receiving cylinder.
Figure 20:
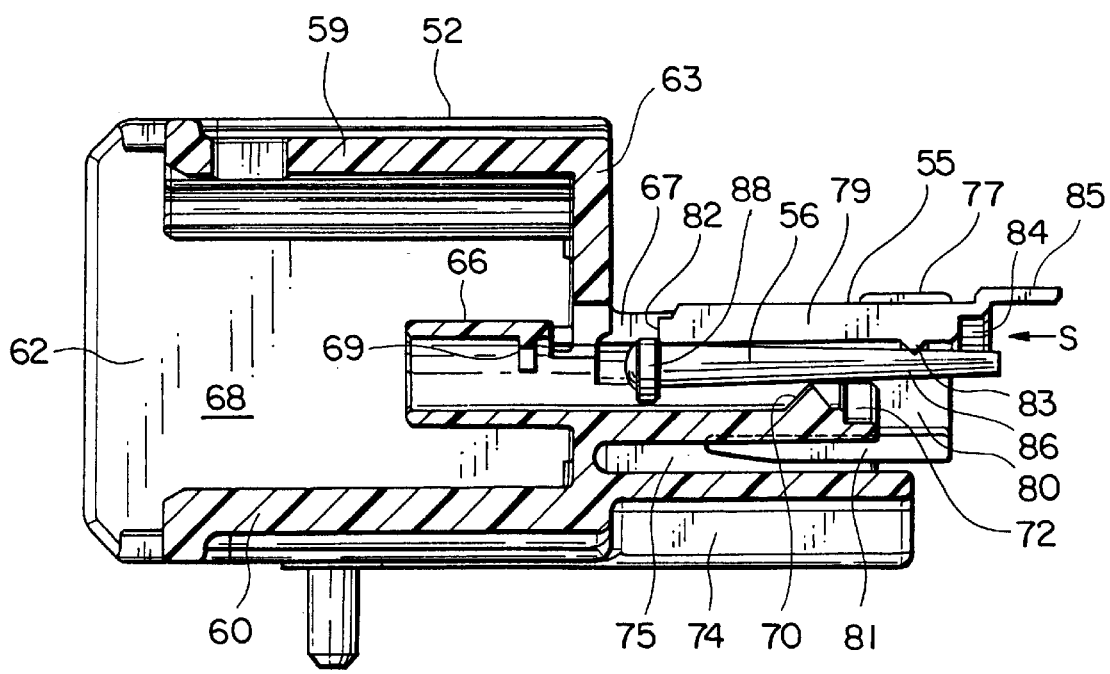
FIG. 20 is a sectional view illustrating a first assembly step with a sleeve holder when the lens sleeve is on the way to be inserted into the receiving cylinder by the sleeve holder.
Figure 21:
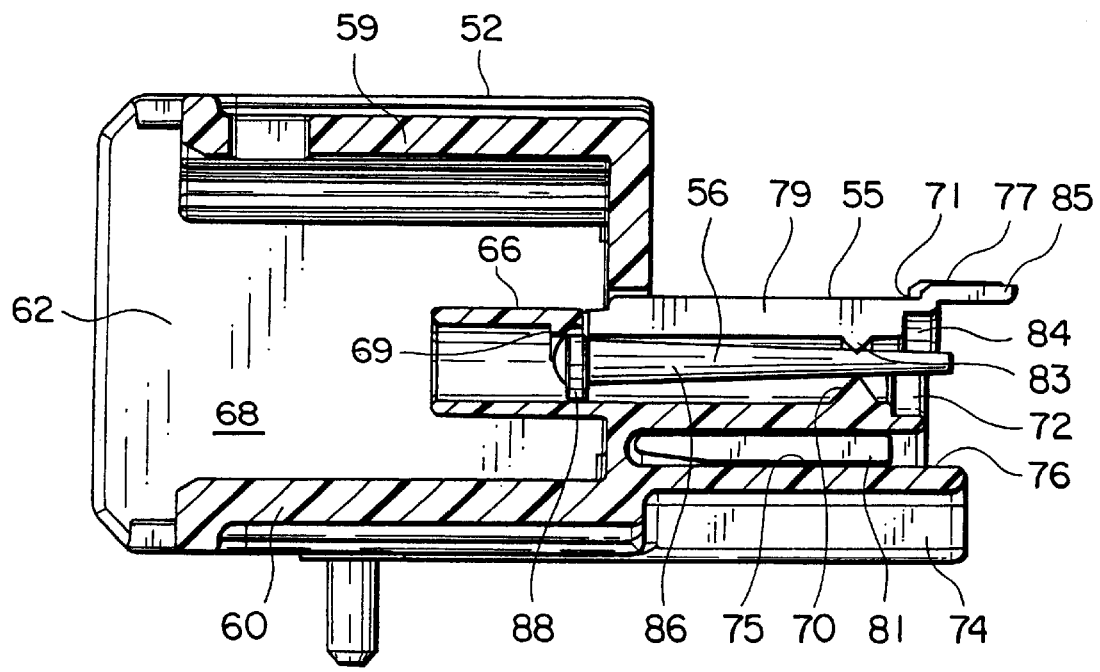
FIG. 21 is a sectional view illustrating a first assembly step with a sleeve holder when the lens sleeve is provisionally inserted into the receiving cylinder.

The first assembly step with a sleeve holder will be explained with reference to FIGS. 18–21. FIG. 18 is a sectional view illustrating a first assembly step with a sleeve holder before the insertion of the lens sleeve (sleeve). FIG. 19 is a sectional view illustrating a first assembly step with a sleeve holder when the lens sleeve is set against the receiving cylinder. FIG. 20 is a sectional view illustrating a first assembly step with a sleeve holder when the lens sleeve is on the way to be inserted into the receiving cylinder by the sleeve holder. FIG. 21 is a sectional view illustrating a first assembly step with a sleeve holder when the lens sleeve is provisionally inserted into the receiving cylinder.

In FIG. 18, the lens sleeves 56 are moved in the direction of arrow R with being held the sides thereof and set up at a position in the receiving cylinder 66 as shown in FIG. 19. (The flange 88 of the lens sleeve 56 is situated between the stopper 69 and the fifth projection 70 of the receiving cylinder 66.)

Then, as shown in FIG. 20, the sleeve holder 55 is moved in the direction of arrow S so as to start the insertion thereof into the housing 52. Thereby, the press part 82 of the sleeve holder 55 abuts against the flange 88 of the lens sleeve 56 and the lens sleeve 56 moves (i.e. being press-inserted) in the direction of arrow S as the sleeve holder 55 moves.

Thereafter, when the flange 88 of the lens sleeve 56 abuts against the stopper 69 of the receiving cylinder 66 so that the lens sleeve 56 and the sleeve holder 55 are prevented from moving (or when the lens sleeve 56 is inserted near to the stopper 69 by the sleeve holder 55), the first assembly step with a sleeve holder is completed. At this time, the lens sleeve 56 is in a provisionally inserted state thereof and the notched portion 67 of the receiving cylinder 66 is closed by the sleeve holder 55. Then, the process advances to the second assembly step with a sleeve holder.

Figure 22:
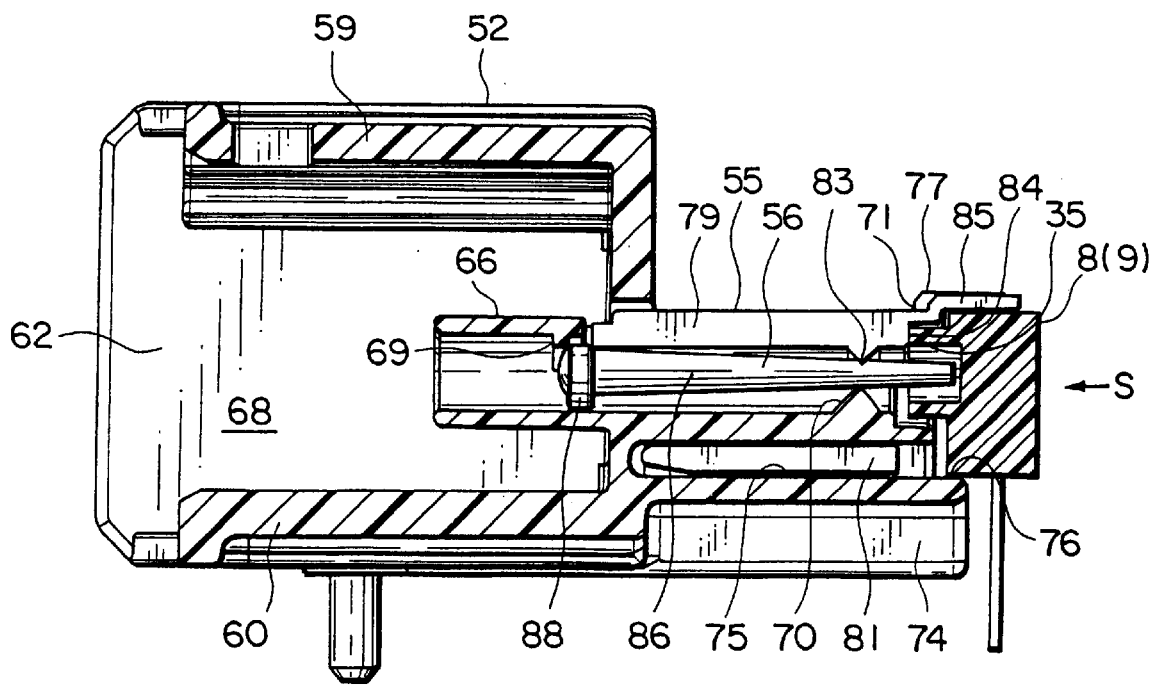
FIG. 22 is a sectional view illustrating a second assembly step with a sleeve holder when the lens sleeve is completely inserted into the receiving cylinder after the optical element module is pressed.

In the following, the second assembly step with a sleeve holder will be explained with reference to FIG. 22. FIG. 22 is a sectional view illustrating a second assembly step with a sleeve holder when the lens sleeve is completely inserted into the receiving cylinder after the optical element module is pressed.

As shown in FIG. 22, the optical element modules 8 and 9 are set up at the corresponding end face side of the lens sleeve 56, which is exposed from the receiving cylinder 66 and the sleeve holder 55. Then, the optical element modules 8 and 9 are moved in the direction of the arrow S so that the optical element modules 8 and 9 are pressed onto the end of the sleeve holder 55 and/or the end face of the lens sleeve 56, thereby the lens sleeve 56 is in a completely inserted state into the receiving cylinder 66.

At this time, the end face of the lens sleeve 56 is received in the second projection 35 of the optical element module 8 or 9. In addition, the second projection 35 of the optical element module 8 or 9 is inserted into and engaged with the hollow portion 72 of the receiving cylinder 66 and the hollow portion 84 of the sleeve holder 55. Thereby, each position of the light-emitting element and the light-receiving element of the optical element modules 8 and 9 is aligned with the axis of the receiving cylinder 66 (i.e. the axis of the lens sleeve 56). Further, the optical element modules 8 and 9 are held among the first wall 76, the second wall 77 and the wall 85 so as to be prevented from rotating. In addition, a pair of fixing pins 65 (see FIG. 16) is also mounted in the second assembly step with a sleeve holder.

The insertion amount of the lens sleeves 56 is determined by the optical element modules 8 and 9. The optical loss due to the clearance between the lens sleeve 56 and the optical element modules 8 and 9 is minimized. Furthermore, since the second projection 35 of each of the optical element modules 8 and 9 is inserted in and engaged with the hollow portion 72 of the receiving cylinder 66 and the hollow portion 84 of the sleeve holder 55, each position of the light-emitting and light-receiving elements is aligned with the axis of the corresponding receiving cylinder 66, thereby the optical loss due to the discrepancy in the alignment between axes is reduced. Since each of the optical element modules 8 and 9 presses the corresponding end face of the lens sleeve 56, the end face of the lens sleeve 56 is free from the fat of the human hand, thereby the deterioration in the transmitting efficiency due to the assembly is prevented from occurring.

When the lens sleeve 56 is in the completely inserted state, the process advances to the third assembly step with a sleeve holder. The third assembly step with a sleeve holder will be explained with reference to FIG. 23. FIG. 23 is a sectional view illustrating a second assembly step with a sleeve holder after the shielding case is mounted.

As shown in FIG. 23, the shielding case 57 is mounted from the direction of arrow T. At this time, the shielding case 57 engages with the engaging parts 71 to hold the optical element modules 8 and 9 therein. The shielding case 57 presses the optical element modules 8 and 9 against the end face of the respective receiving cylinders 66. Thus, each position of the optical element modules 8 and 9 is determined and fixed.

Since the optical element modules 8 and 9 are prevented from rotating, the shielding case 57 is easily assembled.

As explained above, the hybrid connector 51 is assembled through a process including the first assembly step with a sleeve holder, the second assembly step with a sleeve holder (corresponding to the second further modified assembly step with a sleeve holder described in the claims: hereinafter the same) and third assembly step with a sleeve holder. That is, the optical connector 54 portion of the hybrid connector 51 is assembled through the first to third assembly steps with a sleeve holder described above.

Summarizing the first to third assembly steps with a sleeve holder, in the first assembly step with a sleeve holder, each lens sleeve 56 is provisionally inserted halfway through a receiving cylinder 66 of a housing 52.

In the second assembly step with a sleeve holder, optical element modules 8 and 9 are pressed so that the lens sleeve 56 is further inserted into the receiving cylinder 66 to reach the completely inserted state. At this time, each projection 35 of the optical element modules 8 and 9 engages with the hollow portion 72 of the housing 52 side and/or the hollow portion 84 of the sleeve holder 55 side, thereby the position of the optical element is aligned with the axis of the receiving cylinder 66. The optical element modules 8 and 9 are held between a pair of the walls (the first wall 76, the sencond wall 77 and the wall 85) of the housing 52 and the sleeve holder 55.

Each projection 35 of the optical element modules 8 and 9 engages with the hollow portion 72 of the housing 52 side and/or the hollow portion 84 of the sleeve holder 55 side, thereby no clearance arises and each position of the optical element modules 8 and 9 is stable thereafter. The optical element modules 8 and 9 are held between a pair of the walls (the first wall 76, the sencond wall 77 and the wall 85) of the housing 52 and the sleeve holder 55, thereby the positional shift of the optical element modules 8 and 9 due to the rotation thereof is prevented from occurring and each position of the optical element modules 8 and 9 is stable thereafter. Therefore, the workability improves and the optical loss is reduced.

In the third assembly step with a sleeve holder, the shielding case 57 holds the optical element modules 8 and 9. The case 57 engages with the receiving cylinders 66, then each position of the optical element modules 8 and 9 is fixed.

Since the hybrid connector 51 is constructed as described above, the postion of the optical element can be aligned with the axis of the receiving cylinder 66. The undesired positional shift of the optical element modules 8 and 9 due to the rotation thereof is prevented from occurring. Therefore, the position of the optical element modules 8 and 9 is stabilized, the workability improves, and the optical loss is reduced.

Further, besides the features described in the fourth, fifth and sixth aspects of the present invention, the process for assembling the hybrid connector 51 can also be characterized as follows:

a process for assembling a male hybrid connector having electric and optical connectors formed integrally with each other, the optical connector including: at least one optical element module having an optical element; sleeves, each of which has an optical waveguide, provided in accordance with the number of the optical element modules; a housing shared with the electric connector, the housing having receiving cylinders for holding the sleeves therein; a sleeve holder to be inserted in the housing for holding the sleeves together with the receiving cylinders; and a case for holding the optical element modules, the process comprising the steps of:

a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;

a second assembly step with a sleeve holder of pressing each optical element module against an end face of the corresponding sleeve exposed from the receiving cylinder and/or an end of the sleeve holder so that each sleeve is completely inserted into the corresponding receiving cylinder; and a third assembly step with a sleeve holder of engaging the case with the receiving cylinder, while the case holding the optical element modules, so as to fix a position of the optical element module.

The aforementioned preferred embodiment is described to aid in understanding the present invention and variations may be made by one skilled in the art without departing from the spirit and scope of the present invention.

The process for assembling (the first to third assembly steps) according to the present invention can be applied to the assembly of a normal optical connector. The present invention can also be applied to a use for bidirectional communication employing single-core optical fibers.

What is claimed is:

1. A process for assembling a male hybrid connector having electric and optical connectors formed integrally with each other, the optical connector including: at least one optical element module having an optical element; sleeves, each of which has an optical waveguide, provided in accordance with the number of the optical element modules; a housing shared with the electric connector, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second assembly step of reaching a completely inserted state, in which each optical element module is pressed against an end face of the corresponding sleeve exposed from the receiving cylinder so as to further insert the sleeve into the corresponding receiving cylinder, and then engaging a projection formed on the optical element module with a corresponding hollow portion formed in the receiving cylinder so as to align a position of the optical element with an axis of the corresponding receiving cylinder; and a third assembly step of engaging the case with the receiving cylinders, while the case holds the optical element modules, so as to fix a position of the optical element modules with respect to the housing.

2. A process for assembling a male hybrid connector having electric and optical connectors formed integrally with each other, the optical connector including: at least one optical element module having an optical element; sleeves, each of which has an optical waveguide, provided in accordance with the number of the optical element modules; a housing shared with the electric connector, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second modified assembly step of reaching a completely inserted state, in which each optical element module is pressed against an end face of the corresponding sleeve exposed from the receiving cylinder so as to further insert the sleeve into the corresponding receiving cylinder, and then placing the optical element module on a first wall formed in the housing or holding the optical element module between a pair of walls formed in the housing so as to prevent the optical element module from rotating; and a third assembly step of engaging the case with the receiving cylinders, while the case holds the optical element modules, so as to fix a position of the optical element modules with respect to the housing.

3. A process for assembling a male hybrid connector having electric and optical connectors formed integrally with each other, the optical connector including: at least one optical element module having an optical element; sleeves, each of which has an optical waveguide, provided in accordance with the number of the optical element modules; a housing shared with the electric connector, the housing having receiving cylinders for holding the sleeves therein; and a case for holding the optical element modules, the process comprising the steps of:

a first assembly step of reaching a provisionally inserted state, in which each sleeve is partway inserted into the corresponding receiving cylinder;

a second further modified assembly step of reaching a completely inserted state, in which each optical element module is pressed against an end face of the corresponding sleeve exposed from the receiving cylinder so as to further insert the sleeve into the corresponding receiving cylinder, then engaging each second projection formed on the optical element module with a corresponding hollow portion formed in the receiving cylinder so as to align a position of the optical element with an axis of the corresponding receiving cylinder, and then placing the optical element module on a first wall formed in the housing or holding the optical element module between a pair of walls formed in the housing so as to prevent the optical element module from rotating; and a third assembly step of engaging the case with the receiving cylinders, while the case holds the optical element modules, so as to fix a position of the optical element modules with respect to the housing.

4. The process as claimed in any one of claims 1–3, wherein in the first assembly step the sleeve is inserted into the receiving cylinder until the sleeve comes into contact with first projections formed in the receiving cylinder for press-inserting the sleeve and in the second, second modified or second further modified assembly step the sleeve is press-inserted into the receiving cylinder crushing the first projections.

5. The process according to claim 4, wherein a moving length of the sleeve in the receiving cylinder in the second, second modified or second further modified assembly step is shorter than that in the first assembly step.

6. A process for assembling a male hybrid connector having electric and optical connectors formed integrally with each other, the optical connector member including: at least one optical element module having an optical element; sleeves, each of which has an optical waveguide, provided in accordance with the number of the optical element modules; a housing shared with the electric connector, the housing having receiving cylinders for holding the sleeves therein; a sleeve holder to be inserted in the housing for holding the sleeves together with the receiving cylinders; and a case for holding the optical element modules, the process comprising the steps of:

- a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;
- a second assembly step with a sleeve holder of pressing each optical element module against an end face of the corresponding sleeve exposed from the receiving cylinder and/or an end of the sleeve holder so that each sleeve is completely inserted into the corresponding receiving cylinder and then engaging a projection formed on the optical element module with corresponding hollow portions formed in the receiving cylinder and/or on the sleeve holder so as to align a position of the optical element with an axis of the corresponding receiving cylinder; and
- a third assembly step with a sleeve holder of engaging the case with the receiving cylinders, while the case holds the optical element modules, so as to fix a position of the optical element modules with respect to the housing.

7. A process for assembling a male hybrid connector having electric and optical connectors formed integrally with each other, the optical connector member including: at least one optical element module having an optical element; sleeves, each of which has an optical waveguide, provided in accordance with the number of the optical element modules; a housing shared with the electric connector, the housing having receiving cylinders for holding the sleeves therein; a sleeve holder to be inserted in the housing for holding the sleeves together with the receiving cylinders; and a case for holding the optical element modules, the process comprising the steps of:

- a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;
- a second modified assembly step with a sleeve holder of pressing each optical element module against an end face of the corresponding sleeve exposed from the receiving cylinder and/or an end of the sleeve holder so that each sleeve is completely inserted into the corresponding receiving cylinder and then placing the optical element module on a wall formed in the housing and/or the sleeve holder or holding the optical element module between a pair of walls formed in the housing and/or the sleeve holder so as to prevent the optical element module from rotating; and
- a third assembly step with a sleeve holder of engaging the case with the receiving cylinders, while the case holds the optical element modules, so as to fix a position of the optical element modules with respect to the housing.

8. A process for assembling a male hybrid connector having electric and optical connectors formed integrally with each other, the optical connector including: at least one optical element module having an optical element; sleeves, each of which has an optical waveguide, provided in accordance with the number of the optical element modules; a housing shared with the electric connector, the housing having receiving cylinders for holding the sleeves therein; a sleeve holder to be inserted in the housing for holding the sleeves together with the receiving cylinders; and a case for holding the optical element modules, the process comprising the steps of:

- a first assembly step with a sleeve holder of setting the sleeves in the receiving cylinder, fitting the sleeve holder thereto and inserting each sleeve into the corresponding receiving cylinder by the sleeve holder so that each sleeve is provisionally inserted into the corresponding receiving cylinder;
- a second further modified assembly step with a sleeve holder of pressing each optical element module against an end face of the corresponding sleeve exposed from the receiving cylinder and/or an end of the sleeve holder so that each sleeve is completely inserted into the corresponding receiving cylinder, then engaging a projection formed on the optical element module with a corresponding hollow portion formed in the housing and or the sleeve holder so as to align a position of the optical element with an axis of the corresponding receiving cylinder, and then placing the optical element module on a wall formed in the housing and/or the sleeve holder or holding the optical element module between a pair of walls formed in the housing and/or the sleeve holder so as to prevent the optical element module from rotating; and
- a third assembly step with a sleeve holder of engaging the case with the receiving cylinders, while the case holds the optical element modules, so as to fix a position of the optical element modules with respect to the housing.

9. A male hybrid connector including electric and optical connector members formed integrally with each other, the optical connector member comprising:

- at least one optical element module having an optical element;
- sleeves, each of which has an optical waveguide, provided in accordance with the number of the optical element modules;
- a housing shared with the electric connector member, the housing having receiving cylinders for holding the sleeves therein; and
- a case for holding the optical element modules and positioning the optical element modules with respect to the housing, wherein a hollow portion depressed along an axis of the receiving cylinder is formed in the receiving cylinder at the side into which the sleeve is inserted and each optical element module is provided with a second projection for engaging with the hollow portion and aligning the position of the optical element with the axis.

10. A male hybrid connector including electric and optical connector members formed integrally with each other, the optical connector member comprising:

- at least one optical element module having an optical element;
- sleeves, each of which has an optical waveguide, provided in accordance with the number of the optical element modules;

a housing shared with the electric connector, the housing having receiving cylinders for holding the sleeves therein; and a case for holding the optical element modules and positioning the optical element modules with respect to the housing, wherein a first wall is formed in the housing at the side into which the sleeve is inserted so that the first wall places the optical element modules thereon and prevents the optical element modules from rotating before the case covers the optical element modules.

11. A male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector, the housing having receiving cylinders for holding the sleeves therein; and a case for holding the optical element modules and positioning the optical element modules with respect to the housing, wherein a first wall is formed in the housing at the side into which the sleeve is inserted so that the first wall places the optical element modules thereon and prevents the optical element modules from rotating before the case covers the optical element modules, a hollow portion depressed along an axis of the receiving cylinder is formed in the receiving cylinder at the side into which the sleeve is inserted, and each optical element module is provided with a projection for engaging with the hollow portion and aligning the position of the optical element with the axis.

12. The male hybrid connector according to any one of claim 10 or claim 11, wherein a second wall, which faces the first wall and cooperates with the first wall to hold the optical element modules therebetween, is formed on the receiving cylinder.

13. A male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector member, the housing having receiving cylinders for holding the sleeves therein;

a sleeve holder to be inserted in the housing for holding the sleeves together with the receiving cylinders; and a case for holding the optical element modules and positioning the optical element modules with respect to the housing, wherein a hollow portion depressed along an axis of the receiving cylinder is formed in the receiving cylinder at the side into which the sleeve is inserted and/or on an end of the sleeve holder, and each optical element module is provided with a second projection for engaging with the hollow portion and aligning the position of the optical element with the axis.

14. A male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector member, the housing having receiving cylinders for holding the sleeves therein;

a sleeve holder to be inserted in the housing for holding the sleeves together with the receiving cylinders; and a case for holding the optical element modules and positioning the optical element modules with respect to the housing, wherein a first wall is formed in the housing at the side into which the sleeve is inserted and/or on an end of the sleeve holder so that the first wall receives the optical element modules thereon and prevents the optical element modules from rotating before the case covers the optical element modules.

15. A male hybrid connector including electric and optical connector members formed integrally with each other, the optical connector member comprising:

at least one optical element module having an optical element;

sleeves, each of which has an optical waveguide, provided in accordance with the number of the optical element modules;

a housing shared with the electric connector, the housing having receiving cylinders for holding the sleeves therein;

a sleeve holder to be inserted in the housing for holding the sleeves together with the receiving cylinders; and a case for holding the optical element modules and positioning the optical element modules with respect to the housing, wherein a first wall is formed in the housing at the side into which the sleeve is inserted and/or on an end of the sleeve holder so that the first wall receives the optical element modules thereon and prevents the optical element modules from rotating before the case covers the optical element modules, a hollow portion depressed along an axis of the receiving cylinder is formed in the receiving cylinder at the side into which the sleeve is inserted, and each optical element module is provided with a projection for engaging with the hollow portion and aligning the position of the optical element with the axis.

16. The male hybrid connector according to claim 14 or claim 15, wherein a second wall, which faces the first wall, and cooperates with the first wall to hold the optical element modules therebetween, is formed on the receiving cylinder and/or the sleeve holder.

* * * * *